(12) United States Patent
Kimura et al.

(10) Patent No.: US 7,910,214 B2
(45) Date of Patent: Mar. 22, 2011

(54) MOLDED FERRITE SHEET, SINTERED FERRITE SUBSTRATE AND ANTENNA MODULE

(75) Inventors: Tetsuya Kimura, Otake (JP); Tomohiro Dote, Otake (JP); Kazumi Yamamoto, Otake (JP); Takanori Doi, Otake (JP); Yoji Okano, Otake (JP)

(73) Assignee: Toda Kogyo Corporation, Hiroshima-shi, Hiroshima-ken (JP)

( * ) Notice: Subject to any disclaimer, the term of this patent is extended or adjusted under 35 U.S.C. 154(b) by 312 days.

(21) Appl. No.: 12/073,565

(22) Filed: Mar. 6, 2008

(65) Prior Publication Data
US 2008/0224937 A1    Sep. 18, 2008

(30) Foreign Application Priority Data

Mar. 7, 2007  (JP) ................. 2007-057892
Oct. 31, 2007 (JP) ................. 2007-282576

(51) Int. Cl.
*B32B 9/04* (2006.01)

(52) U.S. Cl. ............. 428/425.9; 428/842.3; 252/62.6; 252/62.62

(58) Field of Classification Search ............ 428/846, 428/411.1, 425.9, 842.3, 847.1; 252/62.6, 252/62, 62.62
See application file for complete search history.

(56) References Cited

U.S. PATENT DOCUMENTS

| | | | |
|---|---|---|---|
| 6,759,137 B1 * | 7/2004 | Furuya et al. | 428/611 |
| 6,821,618 B2 * | 11/2004 | Koujima et al. | 428/831.2 |
| 7,368,146 B2 * | 5/2008 | Furuya et al. | 427/130 |
| 7,625,633 B2 * | 12/2009 | Kawaguchi et al. | 428/411.1 |
| 2009/0146898 A1 | 6/2009 | Akiho et al. | |
| 2009/0314411 A1 | 12/2009 | Kawaguchi et al. | |
| 2009/0314539 A1 | 12/2009 | Kawaguchi et al. | |

FOREIGN PATENT DOCUMENTS

| | | |
|---|---|---|
| EP | 1 744 398 A1 | 1/2007 |
| JP | 2005-015281 | 1/2005 |
| JP | 2005 203723 A | 7/2005 |
| WO | WO 2006/036012 A1 | 4/2006 |

OTHER PUBLICATIONS

European Search Report in EP 08 25 0768 dated Jul. 8, 2010.

* cited by examiner

*Primary Examiner* — Cathy Lam
(74) *Attorney, Agent, or Firm* — Nixon & Vanderhye P.C.

(57) ABSTRACT

The present invention relates to a molded ferrite sheet having opposing surfaces and a thickness in a range of 30 μm to 430 μm, at least one surface of said opposing surfaces having the following surface roughness characteristics (a) to (c):
(a) a center line average roughness is in a range of 170 nm to 800 nm,
(b) a maximum height is in a range of 3 μm to 10 μm, and
(c) an area occupancy rate of cross-sectional area taken along a horizontal plane at a depth of 50% of the maximum height in a square of side 100 μm is in a range of 10 to 80%.

6 Claims, 12 Drawing Sheets

MOLDED FERRITE SHEET, SINTERED FERRITE SUBSTRATE AND ANTENNA MODULE

This application claims priority to JP 2007-057892 filed Mar. 7, 2007 and JP 2007-282576 filed Oct. 31, 2007, the entire contents of each of which are hereby incorporated by reference.

BACKGROUND OF THE INVENTION

The present invention relates to a molded ferrite sheet for use in preparing a thin single-layer soft magnetic sintered ferrite substrate, to a thin single-layer soft magnetic sintered ferrite substrate, and to an antenna module for a noncontact IC tag using RFID (Radio Frequency Identification) technology.

In the fabrication of sintered ferrite substrates, a plurality of superposed molded sheets of a ferrite powder or a mixture of a ferrite powder and a resin are sintered at a time. In this case, the resulting sintered ferrite substrates tend to stick or bond to each other and/or to the sintering table on which they are supported during sintering. When the stuck sintered ferrite substrates are peeled from each other or removed from the sintering table, the sintered ferrite substrates may be damaged. In order to prevent the sticking, a releasing powder such as zirconia powder or alumina powder is usually applied to the surfaces of the molded ferrite sheets and the sintering table prior to sintering and removed after sintering. This procedure is very troublesome. In addition, the releasing powder is difficult to remove completely from the sintered ferrite substrates and thus may contaminate the electronic precision components in which the sintered ferrite substrates are used.

For example, In Japanese Patent Application Laid-open (KOKAI) No. 2-305416 (1990) which relates to a ferrite sheet for supporting a ferrite core of a molded ferrite body and preventing deformation thereof during sintering, it is described, in the description of the related art, that alumina powder is customarily provided on a setter as underlying powder to prevent the deformation by shrinkage during sintering. The method in which the ferrite sheet is used to prevent deformation of a ferrite core is low in productivity. In addition, the use of such an additional ferrite sheet is not desirable from the standpoint of cost. The method using an underlying powder, on the other hand, has a problem because, especially when the molded ferrite sheets to be sintered are thin, the obtained sintered ferrite substrates are apt to undulate or break due to physical contact of the substrates with aggregates of the powder formed thereunder during sintering or some other reasons.

In Japanese Patent Application Laid-open (KOKAI) No. 2006-174223, there is disclosed a method for preparing an antenna-integrated magnetic sheet in which a plurality of 2 mm square ferrite pieces are arranged on a sheet substrate and fixedly bonded thereto. Another sheet substrate and an antenna pattern are then placed over the ferrite pieces. This approach is, however, impractical since it is difficult to arrange the ferrite pieces regularly on a sheet substrate in an efficient manner.

When conventional antenna modules used in noncontact IC tags using the RFID technology and so on cannot transmit or receive radio waves when placed in the vicinity of a metal component because a magnetic flux is converted into an eddy current by the metal component. As a countermeasure against this drawback, a method is widely used in which an antenna module having a conductive loop coil is formed in a spiral shape in a plane and a soft magnetic sheet is laminated in parallel to the coil. In recent years, the demand for size reduction of electronic devices such as cellular phones and for high-density mounting of electronic components is increasing. In addition, the need for an antenna module which is thinner and can provide stable communication even if placed in the vicinity of a metal component is increasing more and more.

In Japanese Patent No. 3,728,320, there is described an invention of an antenna module having a loop coil and a magnetic sheet laminate. A capacitor is connected in parallel to the loop coil to tune the antenna module to a desired frequency such as 13.56 MHz prior to installation. However, when the antenna module is incorporated in an electronic device and the electronic device is placed in the vicinity of a metal component, the resonant frequency of the antenna may be changed. This is a major problem in practical applications. In Japanese Patent Application Laid-open (KOKAI) No. 2005-340759, there is described an antenna module having a metallic shield plate. The antenna module comprises a ferrite sheet-laminated magnetic member having a thickness of about 0.5 mm and coated with PET or PPS, and a metallic shield plate attached to the non-communication face of the magnetic member. However, it is difficult to reduce the thickness of an antenna module of this type, and the recent demand for size reduction of electronic devices cannot be satisfied.

SUMMARY OF THE INVENTION

An object of the present invention is to provide a molded ferrite sheet which permits the preparation of clean and thin sintered ferrite substrates which are not stuck to each other or to the sintering table even without a releasing powder such as zirconia powder or alumina powder. Another object of the present invention is to provide a clean sintered ferrite substrate free of residual releasing powder which may contaminate electronic devices.

Some antennas for use in the vicinity of a metal component are provided in advance with a magnetic sheet or the like for tuning it to a desired frequency. However, when such an antenna is placed in the vicinity of the metal component, the resonant frequency of the antenna is changed. Thus, the antennas must be tuned to a desired frequency after they have been incorporated in electronic devices. It is, therefore, a further object of the present invention to eliminate such a laborious procedure and to provide a thin antenna module which has a specific frequency that has been previously adjusted after mounting a magnetic member and which does not undergo any significant change in its frequency even when placed in the vicinity of a metal component.

It is yet a further object of the present invention to eliminate the instability of the antenna characteristics of an antenna for use in the vicinity of a metal component which has been hitherto caused by the presence of gaps formed between a magnetic member and a metallic shield plate.

The above-described technical problems can be solved by the present invention as follows.

The present invention provides a molded ferrite sheet having opposing surfaces and a thickness in a range of 30 μm to 430 μm, at least one surface of said opposing surfaces having the following surface roughness characteristics (a) to (c):

(a) a center line average roughness is in a range of 170 nm to 800 nm, (b) a maximum height is in a range of 3 μm to 10 μm, and (c) an area occupancy rate of cross-sectional area taken along a horizontal plane at a depth of 50% of the maximum height in a square of side 100 μm is in a range of 10 to 80% (Invention 1).

The present invention also provides a molded ferrite sheet as recited in Invention 1, wherein said at least one surface is roughened by sandblasting (Invention 2).

The present invention further provides a molded ferrite sheet as recited in Invention 1, wherein said molded ferrite sheet is prepared by molding under pressure using a mold or calender roll having a roughened surface so that the roughness of the roughened surface of said mold or calender roll is transferred to a surface of said molded ferrite sheet in contact with the roughened surface of said mold or calender roll (Invention 3).

The present invention further provides a molded ferrite sheet as recited in Invention 1, wherein said molded ferrite sheet is prepared by a method which comprises applying a coating of a ferrite-dispersed coating liquid to a surface of a plastic film, and drying the applied coating, and wherein said surface of said plastic film has been roughened by sandblasting so that the roughness of said plastic film is transferred to a surface of the dried coating in contact with the roughened surface of said plastic film (Invention 4).

The present invention further provides a molded ferrite sheet as recited in Invention 1, wherein said molded ferrite sheet is prepared by a method which comprises applying a coating of a ferrite-dispersed coating liquid to a support and drying the applied coating, and wherein the ferrite has been obtained by adjusting a particle size of a ferrite powder having an average particle diameter of 0.1 to 10 μm so that said surface roughness characteristics (a) to (c) are imparted to a surface of the dried coating in contact with said support (Invention 5).

The present invention further provides a molded ferrite sheet as recited in Invention 1, wherein the ferrite is Ni—Zn—Cu-based spinel ferrite or Mg—Zn—Cu-based spinel ferrite (Invention 6).

The present invention further provides a sintered ferrite substrate having opposing surfaces and a thickness in a range of 25 μm to 360 μm, at least one surface of said opposing surfaces having the following surface roughness characteristics (a) to (c):

(a) a center line average roughness is in a range of 150 nm to 700 nm, (b) a maximum height is in a range of 2 μm to 9 μm, and (c) an area occupancy rate of cross-sectional area taken along a horizontal plane at a depth of 50% of the maximum height in a square of side 100 μm is in a range of 10 to 80% (Invention 7).

The present invention further provides a sintered ferrite substrate as recited in Invention 7, wherein the ferrite is Ni—Zn—Cu-based spinel ferrite and wherein said sintered ferrite substrate has a magnetic permeability with a real part μr' and an imaginary part μr" of not less than 80 and not greater than 20, respectively, at 13.56 MHz (Invention 8).

The present invention further provides a sintered ferrite substrate as recited in Invention 7, wherein the ferrite is Mg—Zn—Cu-based spinel ferrite and wherein said sintered ferrite substrate has a magnetic permeability with a real part μr' and an imaginary part μr" of not less than 80 and not greater than 100, respectively, at 13.56 MHz (Invention 9).

The present invention further provides a sintered ferrite substrate as recited in Invention 7, wherein a conductive layer is provided on one of the opposing surfaces of the sintered ferrite substrate (Invention 10).

The present invention further provides a sintered ferrite substrate as recited in Invention 7, wherein grooves are formed on at least one of the opposing surfaces of the sintered ferrite substrate (Invention 11).

The present invention further provides a sintered ferrite substrate as recited in Invention 7 or 8, wherein an adhesive film is adhered to at least one of the opposing surfaces of the sintered ferrite substrate and wherein the sintered ferrite substrate is divided into a plurality of parts (Invention 12).

The present invention further provides an antenna module for use in a radio communication medium and a radio communication medium processing device, comprising a magnetic member, a conductive loop antenna provided on one side of said magnetic member, and a conductive layer provided on opposite side of said magnetic member from the conductive loop antenna, said magnetic member being a sintered ferrite substrate according to Invention 7 or 8 (Invention 13).

The present invention further provides an antenna module as recited in Invention 13, wherein said conductive layer has a thickness of not greater than 50 μm and a surface electric resistance of not greater than 3 Ω/square (Invention 14).

The present invention further provides an antenna module as recited in Invention 13, wherein said magnetic member is a Ni—Zn—Cu-based spinel sintered ferrite substrate to which a coating of an acrylic resin-based or epoxy resin-based conductive paint has been applied to form said conductive layer (Invention 15).

The present invention further provides an antenna module as recited in Invention 13, wherein said magnetic member is a Mg—Zn—Cu-based spinel sintered ferrite substrate to which a coating of an acrylic resin-based or epoxy resin-based conductive paint has been applied to form said conductive layer (Invention 16).

The present invention further provides an antenna module as recited in Invention 13, wherein said magnetic member is a Mg—Zn—Cu-based spinel sintered ferrite substrate and wherein said sintered ferrite substrate and said conductive layer provided thereon are formed by forming a print of a silver paste on a molded ferrite sheet, followed by sintering and integrating said silver paint print and said molded ferrite sheet together (Invention 17).

The present invention further provides an antenna module as recited in Invention 13, wherein said magnetic member is a Ni—Zn—Cu-based spinel sintered ferrite substrate and wherein said sintered ferrite substrate and said conductive layer provided thereon are formed by forming a print of a silver paste on a molded ferrite sheet, followed by sintering and integrating said silver paint print and said molded ferrite sheet together (Invention 18).

DESCRIPTION OF REFERENCE NUMERALS

Figure 1:
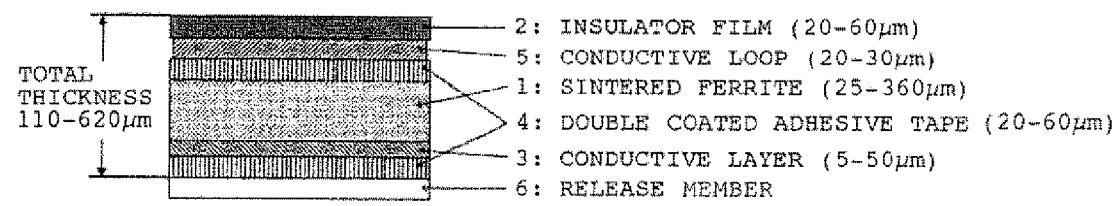
FIG. 1 is a cross-sectional view diagrammatically illustrating a structure of an antenna module.
Figure 2:
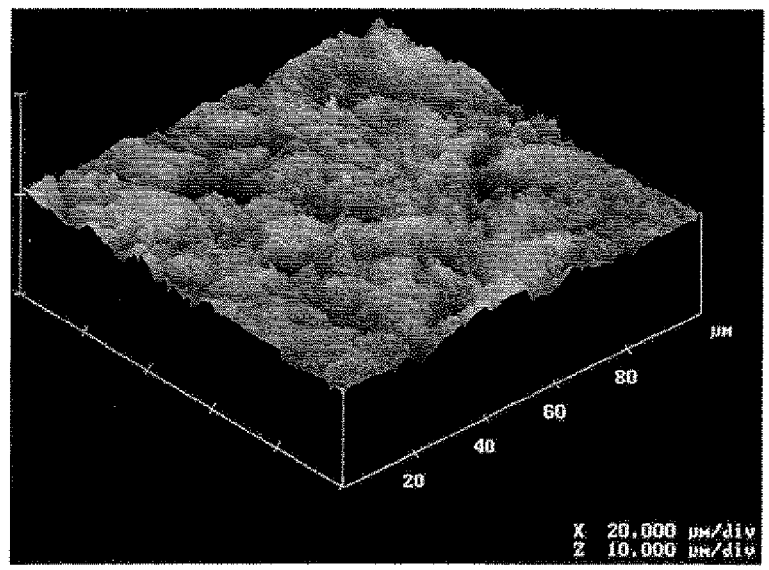
FIG. 2 is an image of the surface shape of a molded ferrite sheet of Example 2.
Figure 3:
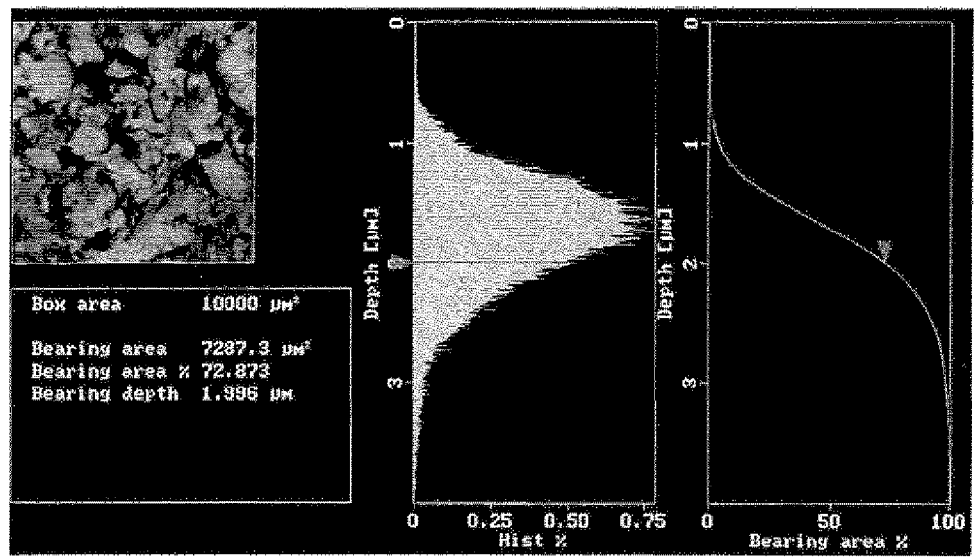
FIG. 3 shows an image and the data of area occupancy rate of the molded ferrite sheet of Example 2 obtained from bearing analysis. In the drawing, an image of the cross-section of the sample taken horizontally at 50% of the maximum height, a histogram of the heights of surface irregularities of the sample, and a graph of their area occupancy rates are shown.
Figure 4:
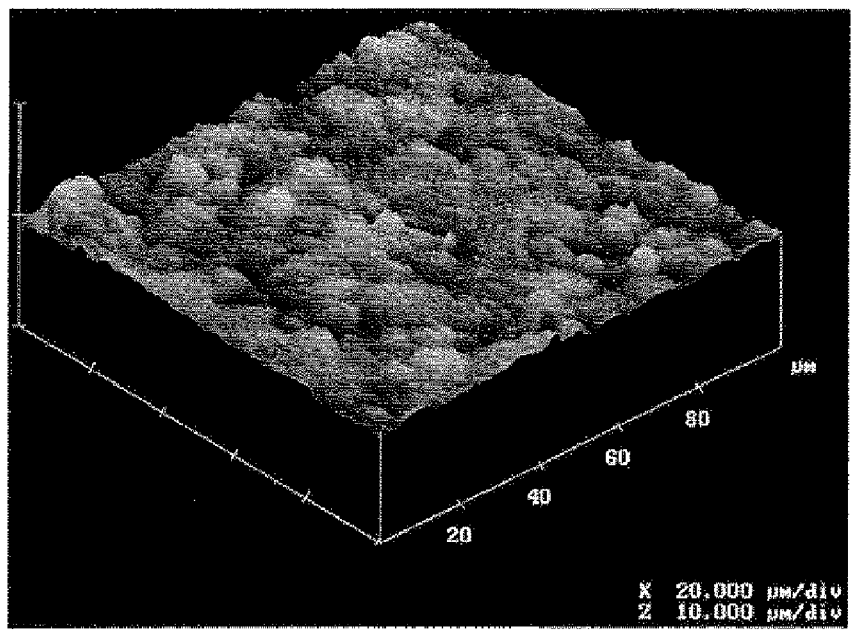
FIG. 4 is an image of the surface shape of a sintered ferrite substrate of Example 2.
Figure 5:
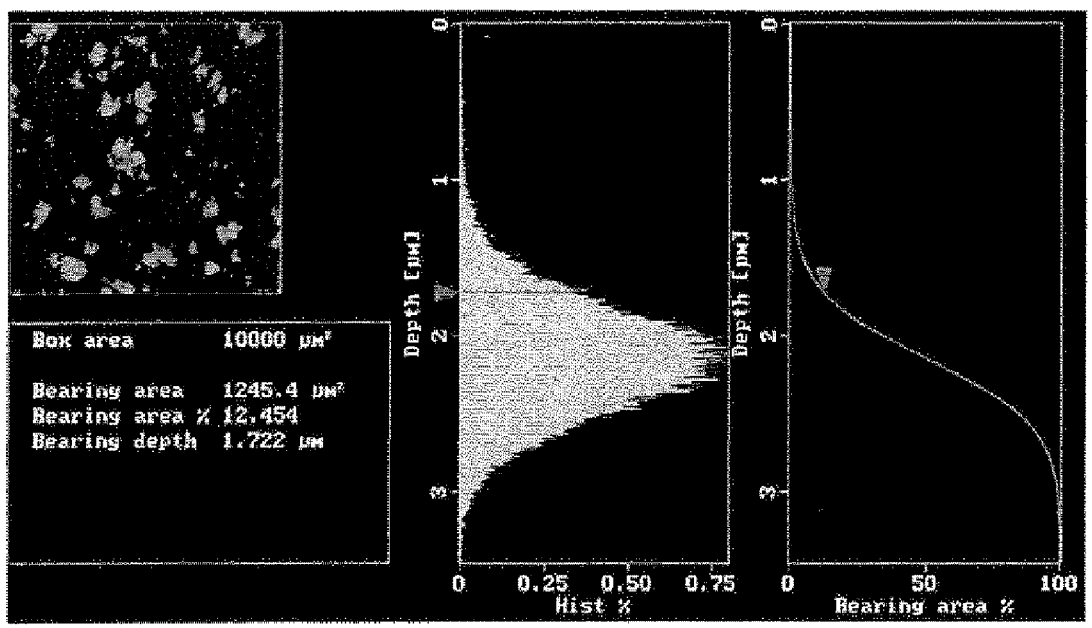
FIG. 5 shows an image and the data of area occupancy rate of the sintered ferrite substrate of Example 2 obtained from bearing analysis. In the drawing, an image of the cross-section of the sample taken horizontally at 50% of the maximum height, a histogram of the heights of surface irregularities of the sample, and a graph of their area occupancy rates are shown.
Figure 6:
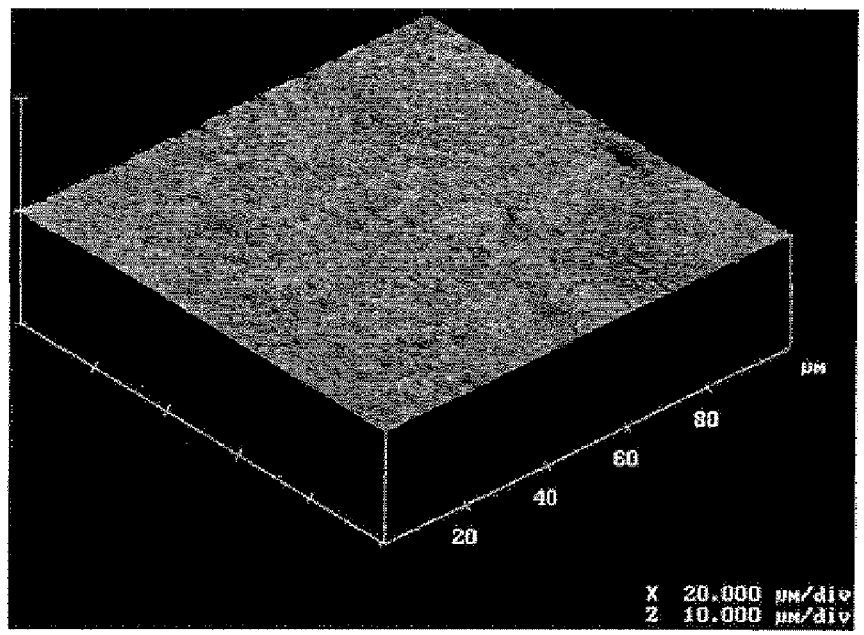
FIG. 6 is an image of the surface shape of a molded ferrite sheet of Comparative Example 2.
Figure 7:
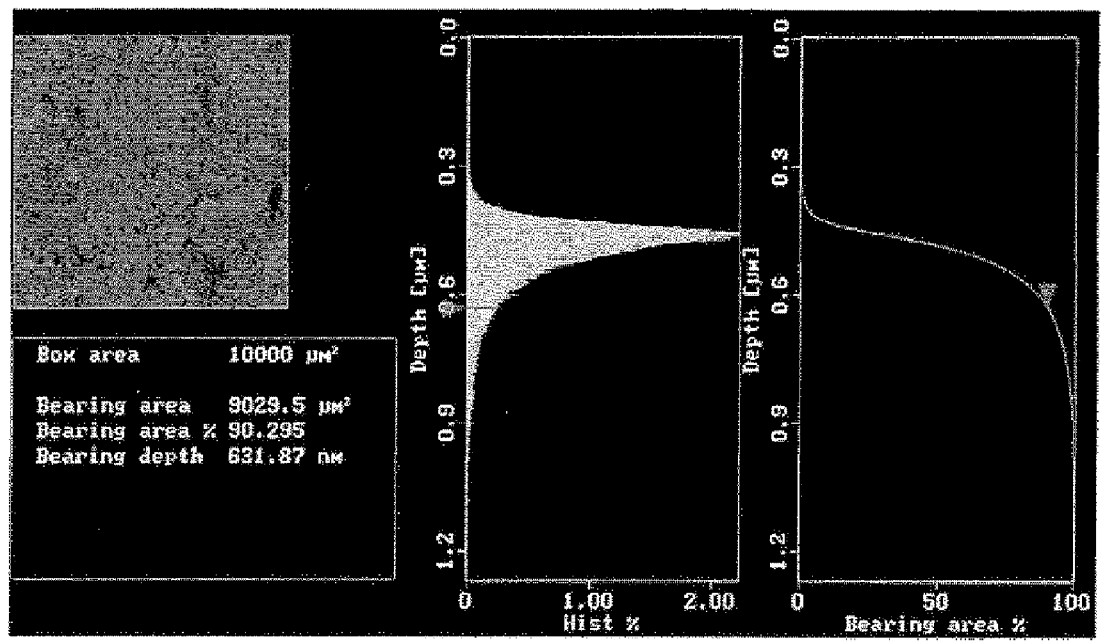
FIG. 7 shows an image and the data of area occupancy rate of the molded ferrite sheet of Comparative Example 2 obtained from bearing analysis. In the drawing, an image of the cross-section of the sample taken horizontally at 50% of the maximum height, a histogram of the heights of surface irregularities of the sample, and a graph of their area occupancy rates are shown.
Figure 8:
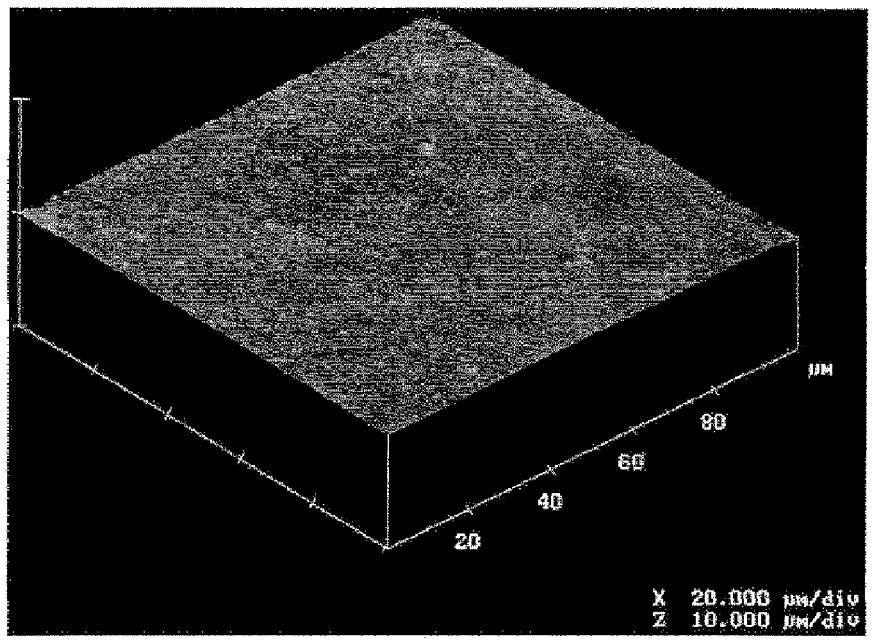
FIG. 8 is an image of the surface shape of a sintered ferrite substrate of Comparative Example 2.
Figure 9:
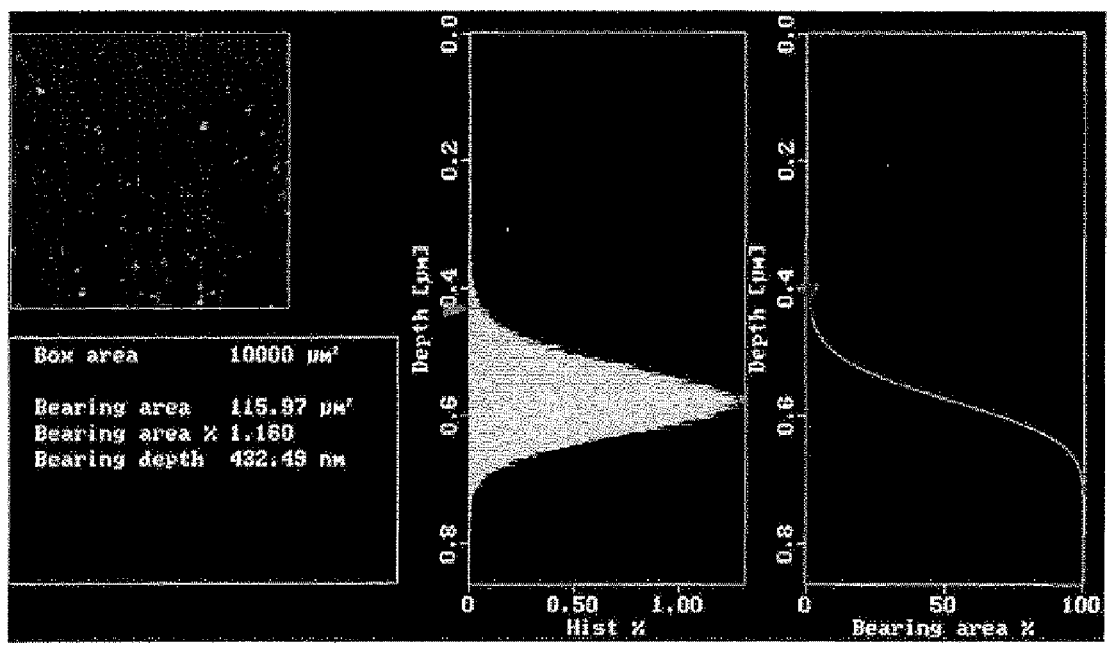
FIG. 9 shows an image and the data of area occupancy rate of the sintered ferrite substrate of Comparative Example 2 obtained from bearing analysis. In the drawing, an image of the cross-section of the sample taken horizontally at 50% of the maximum height, a histogram of the heights of surface irregularities of the sample, and a graph of their area occupancy rates are shown.
Figure 10:
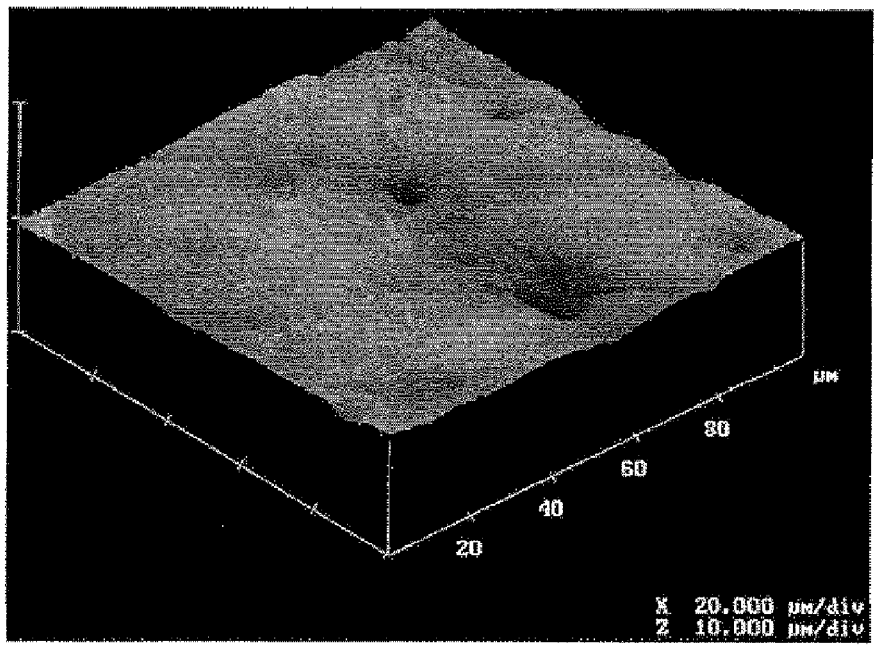
FIG. 10 is an image of the surface shape of a molded ferrite sheet of Comparative Example 5.
Figure 11:
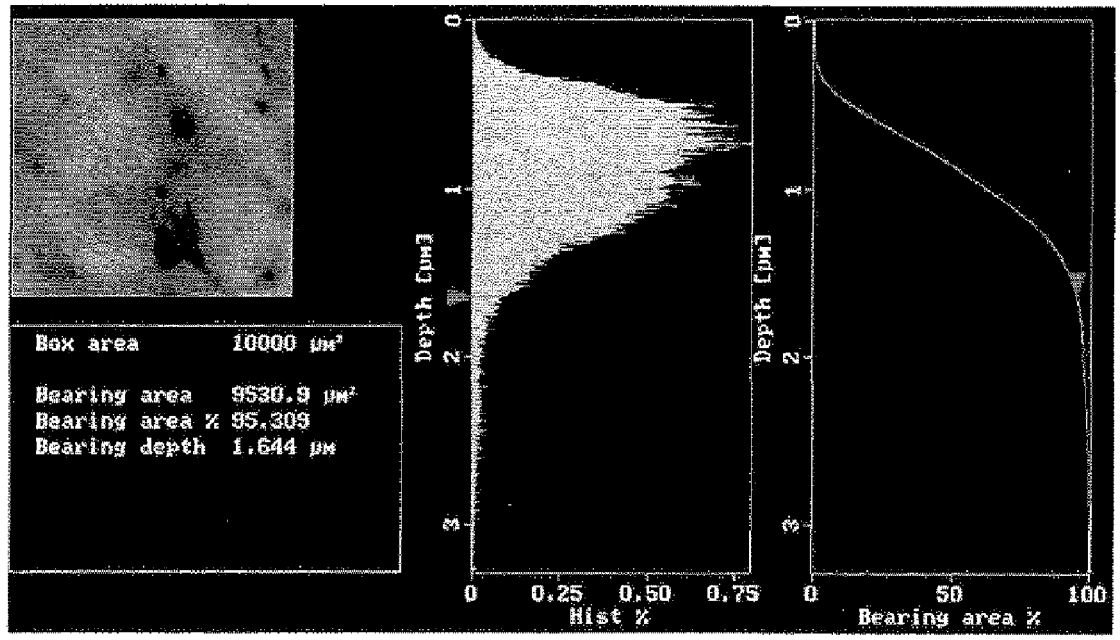
FIG. 11 shows an image and the data of area occupancy rate of the molded ferrite sheet of Comparative Example 5 obtained from bearing analysis. In the drawing, an image of the cross-section of the sample taken horizontally at 50% of the maximum height, a histogram of the heights of surface irregularities of the sample, and a graph of their area occupancy rates are shown.
Figure 12:
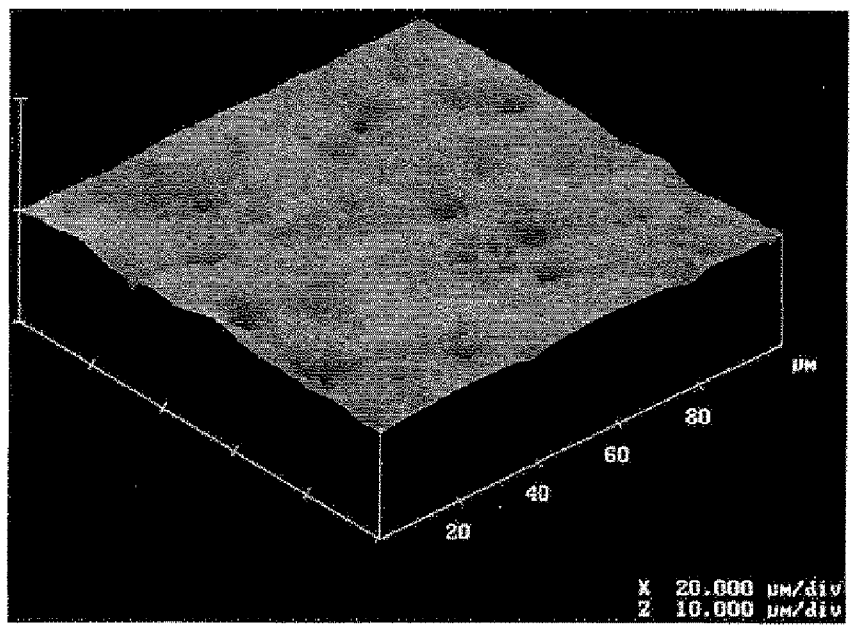
FIG. 12 is an image of the surface shape of a sintered ferrite substrate of Comparative Example 5.
Figure 13:
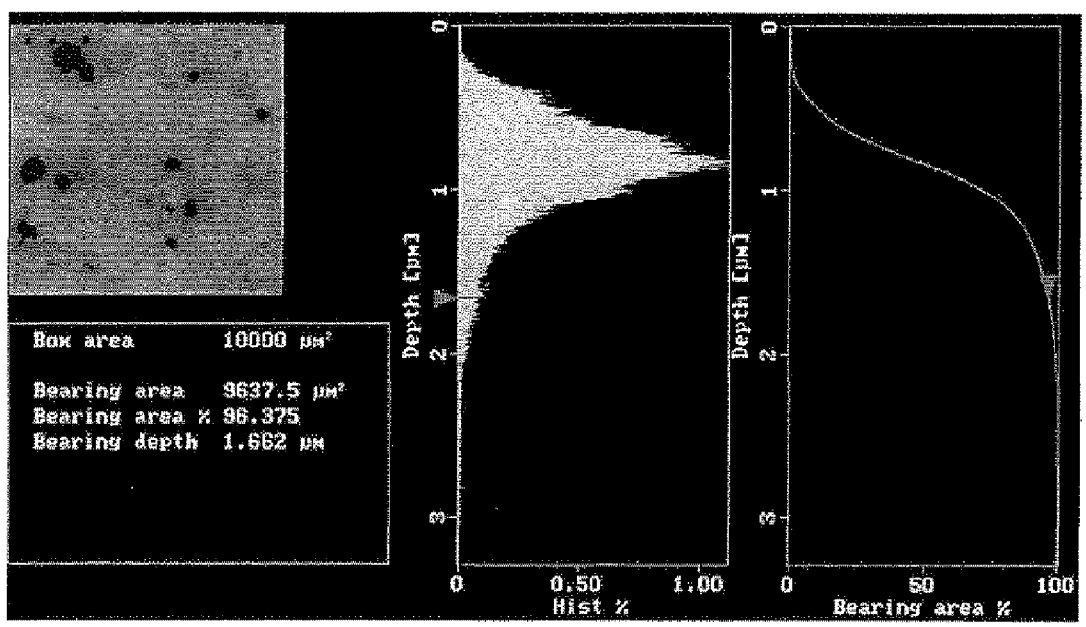
FIG. 13 shows an image and the data of area occupancy rate of the sintered ferrite substrate of Comparative Example 5 obtained from bearing analysis. In the drawing, an image of the cross-section of the sample taken horizontally at 50% of the maximum height, a histogram of the heights of surface irregularities of the sample, and a graph of their area occupancy rates are shown.
Figure 14:
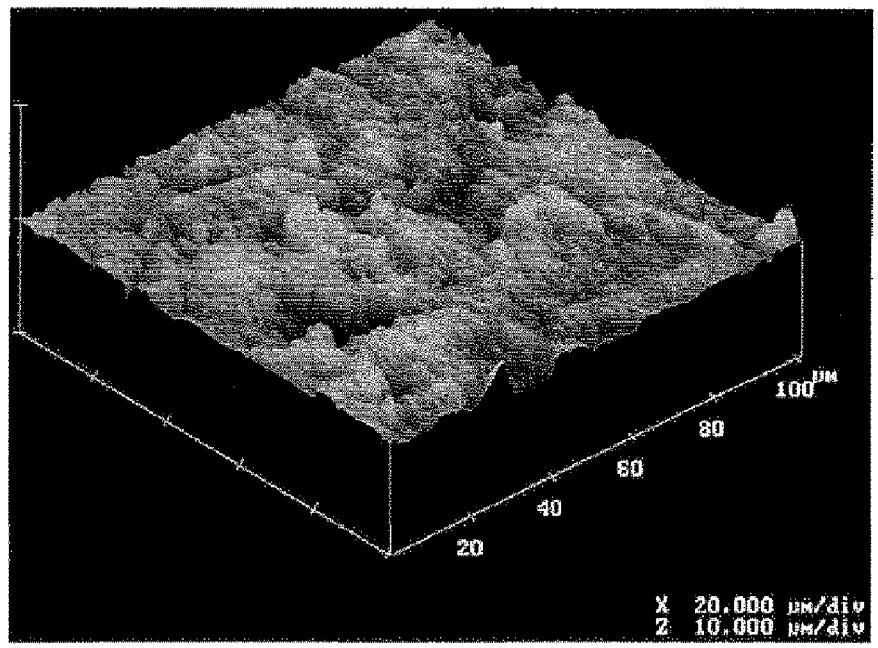
FIG. 14 is an image of the surface shape of a molded ferrite sheet of Example 11.
Figure 15:
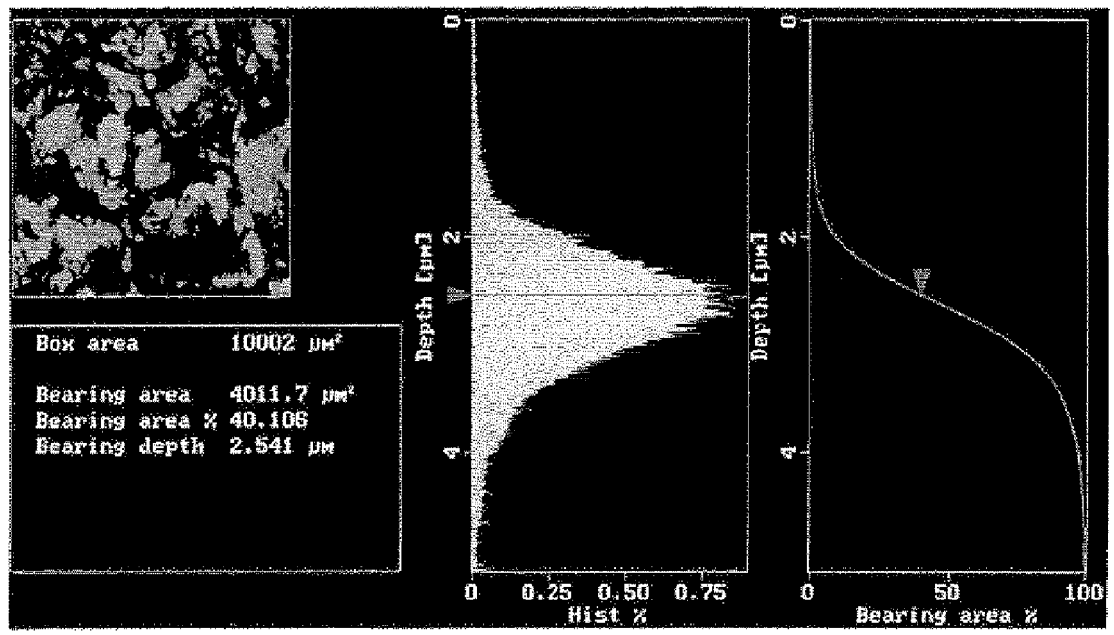
FIG. 15 shows an image and the data of area occupancy rate of the molded ferrite sheet of Example 11 obtained from bearing analysis. In the drawing, an image of the cross-section of the sample taken horizontally at 50% of the maximum height, a histogram of the heights of surface irregularities of the sample, and a graph of their area occupancy rates are shown.
Figure 16:
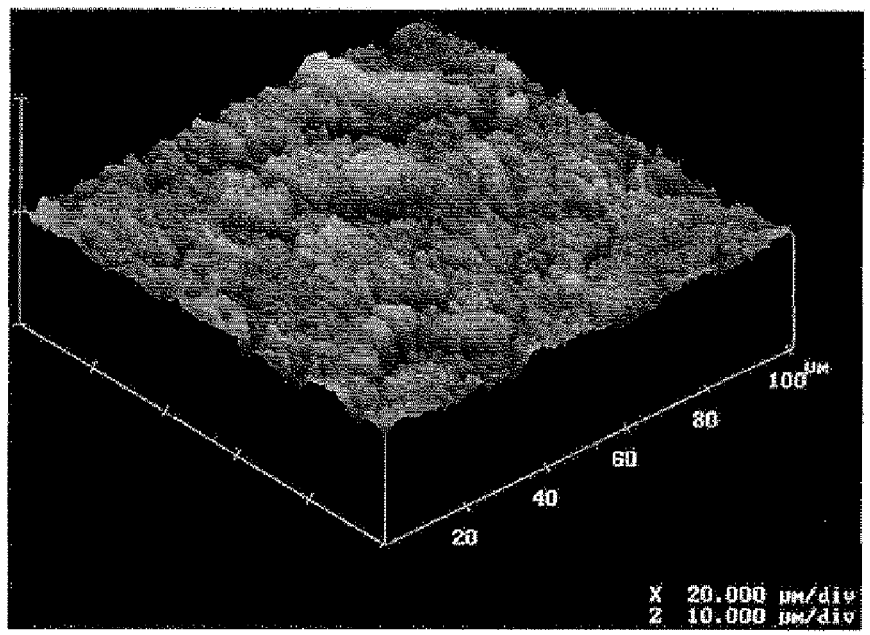
FIG. 16 is an image of the surface shape of a sintered ferrite substrate of Example 11.
Figure 17:
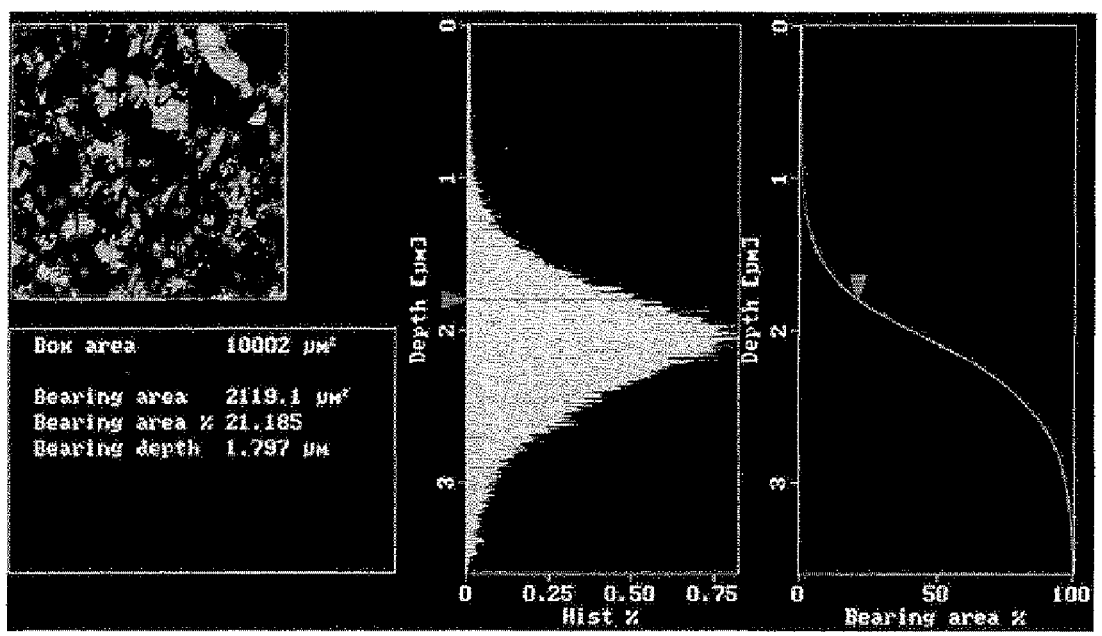
FIG. 17 shows an image and the data of area occupancy rate of the sintered ferrite substrate of Example 11 obtained from bearing analysis. In the drawing, an image of the cross-section of the sample taken horizontally at 50% of the maximum height, a histogram of the heights of surface irregularities of the sample, and a graph of their area occupancy rates are shown.
Figure 18:
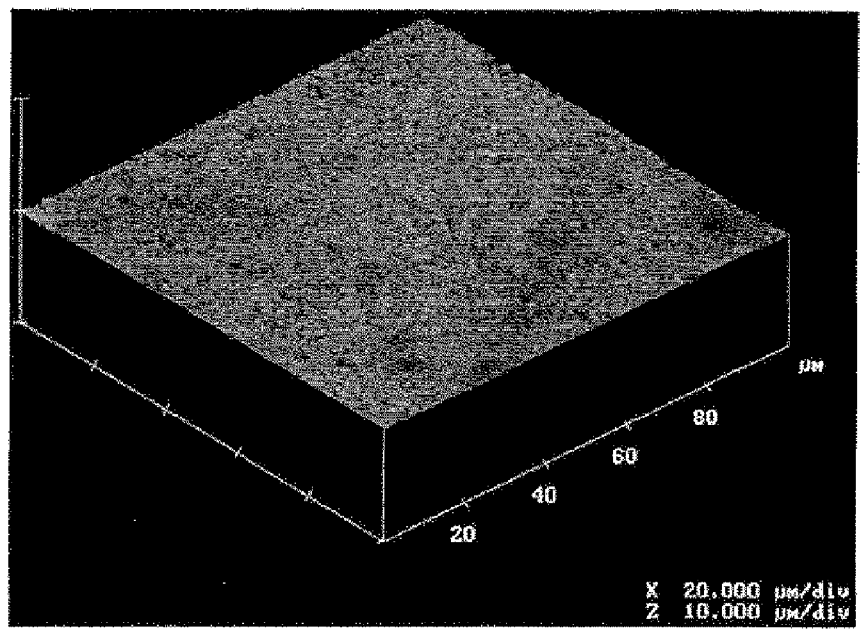
FIG. 18 is an image of the surface shape of a molded ferrite sheet of Comparative Example 10.
Figure 19:
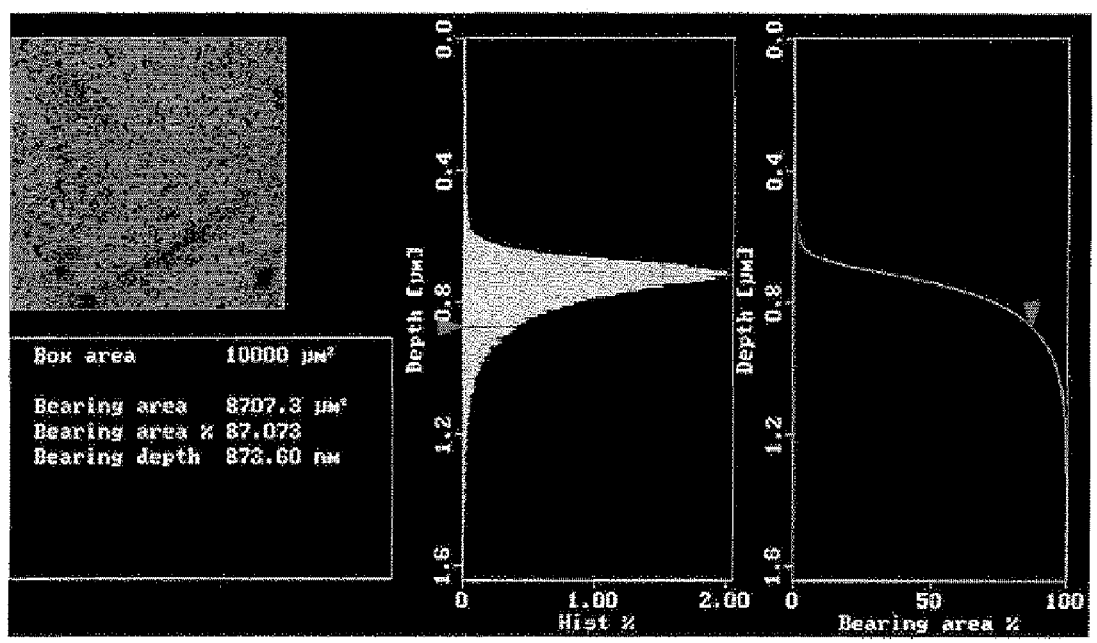
FIG. 19 shows an image and the data of area occupancy rate of the molded ferrite sheet of Comparative Example 10 obtained from bearing analysis. In the drawing, an image of the cross-section of the sample taken horizontally at 50% of the maximum height, a histogram of the heights of surface irregularities of the sample, and a graph of their area occupancy rates are shown.
Figure 20:
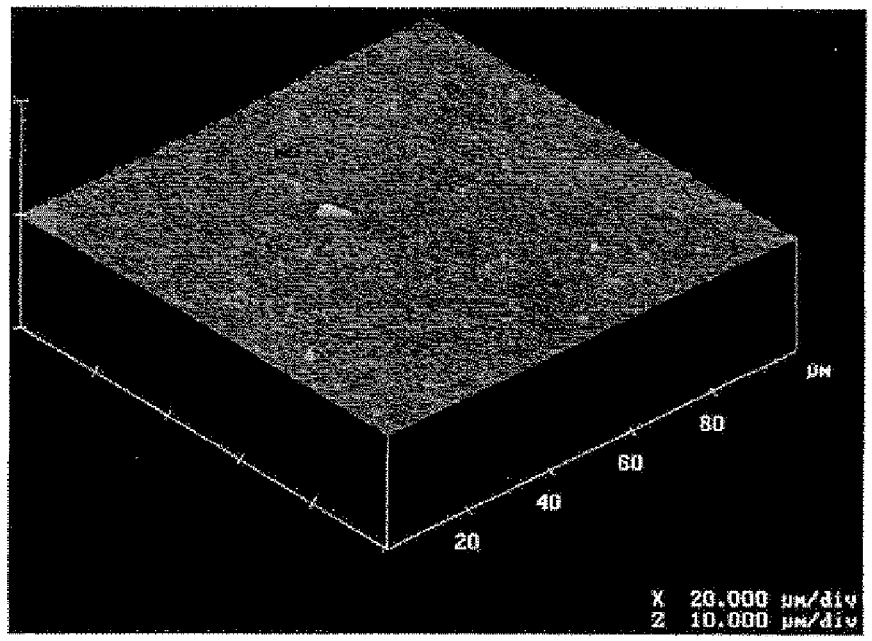
FIG. 20 is an image of the surface shape of a sintered ferrite substrate of Comparative Example 10.
Figure 21:
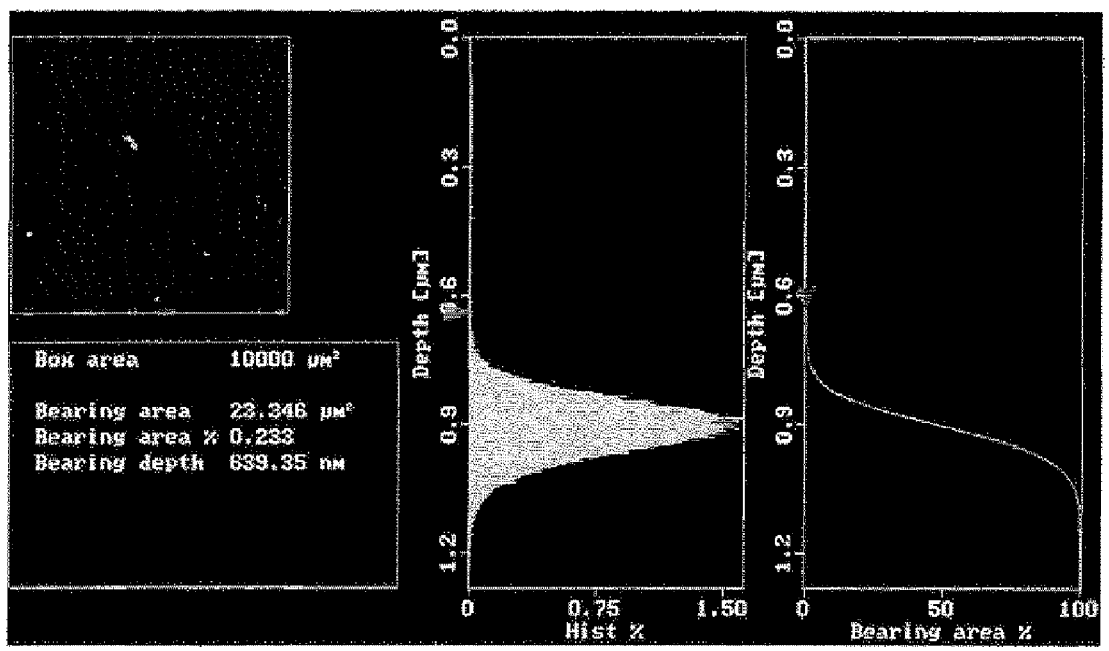
FIG. 21 shows an image and the data of area occupancy rate of the sintered ferrite substrate of Comparative Example 10 obtained from bearing analysis. In the drawing, an image of the cross-section of the sample taken horizontally at 50% of the maximum height, a histogram of the heights of surface irregularities of the sample, and a graph of their area occupancy rates are shown.
Figure 22:
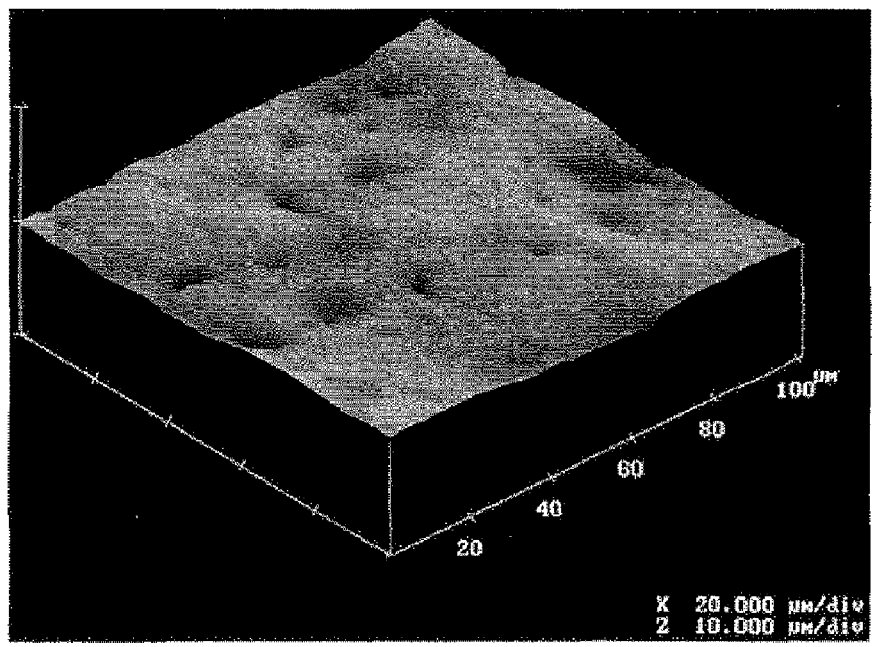
FIG. 22 is an image of the surface shape of a molded ferrite sheet of Comparative Example 13.
Figure 23:
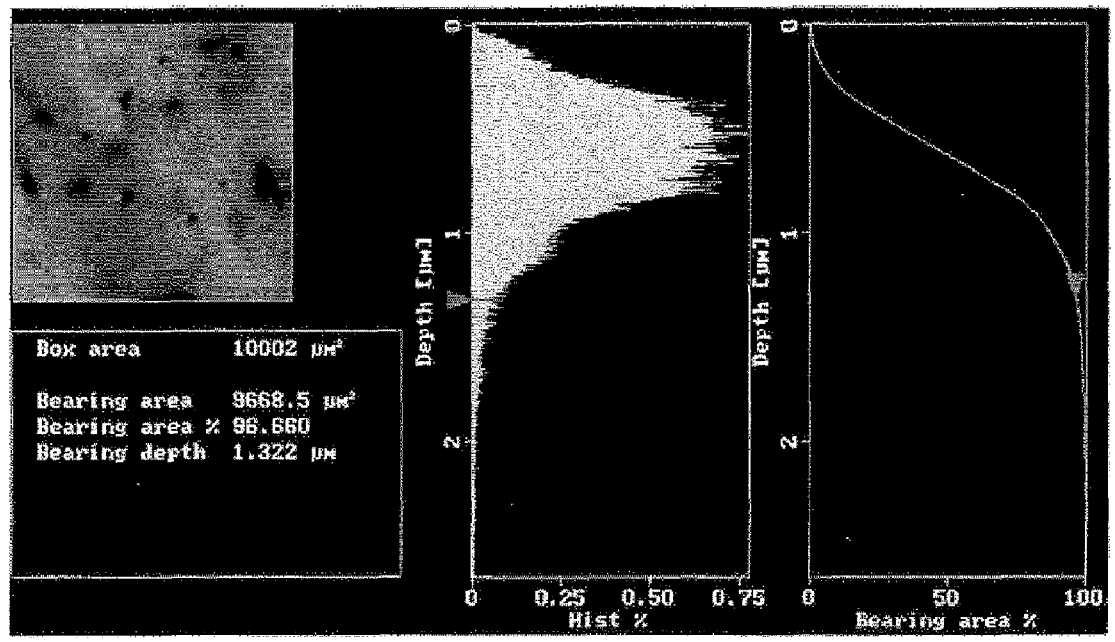
FIG. 23 shows an image and the data of area occupancy rate of the molded ferrite sheet of Comparative Example 13 obtained from bearing analysis. In the drawing, an image of the cross-section of the sample taken horizontally at 50% of the maximum height, a histogram of the heights of surface irregularities of the sample, and a graph of their area occupancy rates are shown.
Figure 24:
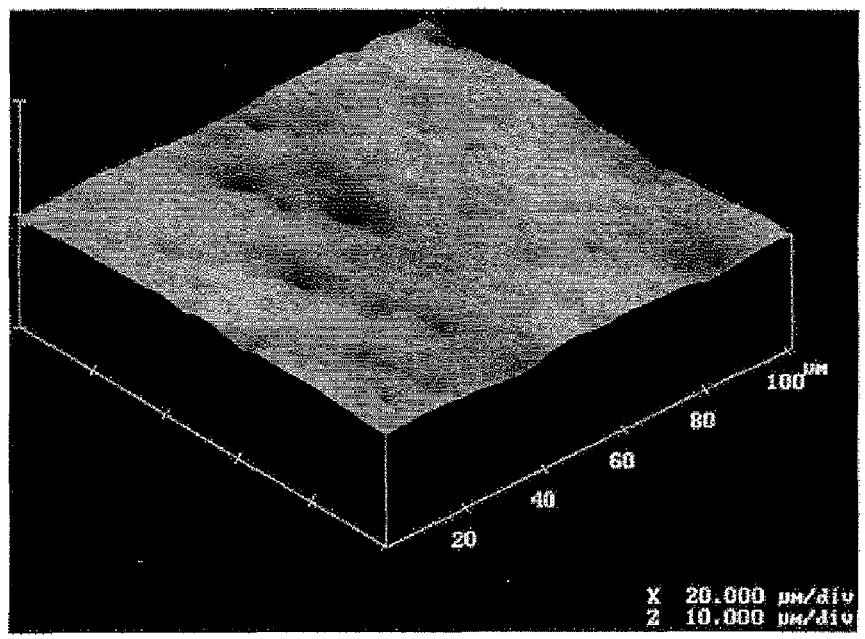
FIG. 24 is an image of the surface shape of a sintered ferrite substrate of Comparative Example 13.
Figure 25:
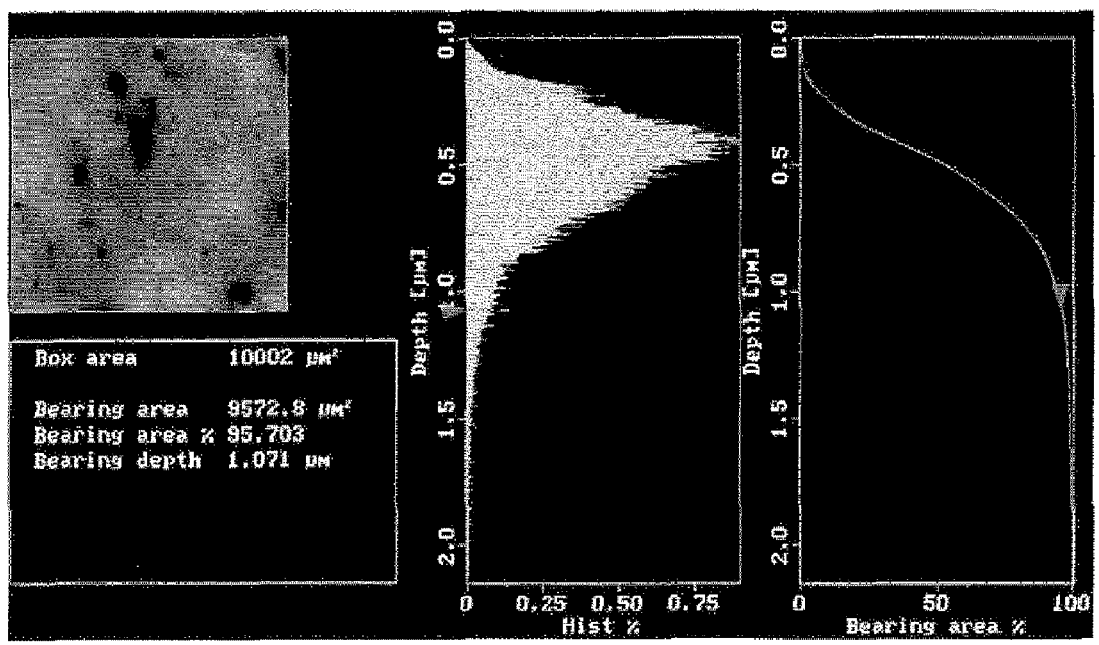
FIG. 25 shows an image and the data of area occupancy rate of the sintered ferrite substrate of Comparative Example 13 obtained from bearing analysis. In the drawing, an image of the cross-section of the sample taken horizontally at 50% of the maximum height, a histogram of the heights of surface irregularities of the sample, and a graph of their area occupancy rates are shown.

1: sintered ferrite substrate
2: insulator film
3: conductive layer
4: double coated adhesive tape
5: conductive loop
6: separator member

DETAILED DESCRIPTION OF THE INVENTION

A molded ferrite sheet according to the present invention will be first described.

The molded ferrite sheet of the present invention has at least one surface having the following surface roughness characteristics (a) to (c):
(a) a center line average roughness (Ra) is in a range of 170 nm to 800 nm,
(b) a maximum height (Rmax) is in a range of 3 μm to 10 μm, and
(c) an area occupancy rate of cross-sectional area taken along a horizontal plane at a depth of 50% of the maximum height in a square of side 100 μm is in a range of 10 to 80%.

Preferably, the center line average roughness is in a range of 180 to 700 nm, and the maximum height is in a range of 4 to 8 μm. In the present invention, it is necessary to control the density of surface irregularities, which cannot be expressed by the center line average roughness and the maximum height. In a bearing analysis performed on a 100 μm box image to measure the surface roughness of the molded ferrite sheet, the area occupancy rate of cross-sectional area taken along a horizontal plane (in parallel with the sheet) at a depth of 50% of the maximum height is in a range of 10 to 80%, preferably in a range of 15 to 75%, based on the box area (10,000 μm$^2$). When the area occupancy rate is within this range, the molded ferrite sheets are not stuck or bonded to each other during sintering even when the sheets are superposed one upon another and no releasing powder is used. As a result, sintered ferrite substrates intended by the present invention can be obtained.

When the center line average roughness is less than 170 nm or the maximum height is less than 3 μm, the sheets are stuck to each other during sintering. When the center line average roughness is greater than 800 nm or the maximum height is greater than 10 μm, the molded sheet has so large a contact area that the molded sheet is difficult to release from molds. In addition, since the resulting sintered ferrite substrate lacks surface smoothness, it breaks easily. Further, gaps tend to be formed between the molded ferrite sheet and an insulator film or conductive layer provided thereon. Furthermore, the resulting sintered ferrite substrate has only a small sintered cross-sectional area and thus has a low magnetic permeability, resulting in poor antenna characteristics. The surface roughness is critical especially when the sintered ferrite substrate has a small thickness of not greater than 200 μm. When the area occupancy rate of cross-sectional area taken along a horizontal plane at a depth of 50% of the maximum height in a square of side 100 μm is less than 10% or greater than 80%, superposed sheets are stuck to each other during sintering and the obtained sintered ferrite substrates will be difficult to separate from each other.

The ferrite powder for the molded ferrite sheet of the present invention is preferably an Ni—Zn—Cu spinel ferrite powder or an Mg—Zn—Cu spinel ferrite powder. When an Ni—Zn—Cu spinel ferrite powder is used, it is preferably composed of 40 to 50 mol % of $Fe_2O_3$, 10 to 30 mol % of NiO, 10 to 30 mol % of ZnO and 0 to 20 mol % of CuO. When an Mg—Zn—Cu spinel ferrite powder is used, it is preferably composed of 40 to 50 mol % of $Fe_2O_3$, 15 to 35 mol % of MgO, 5 to 25 mol % of ZnO and 0 to 20 mol % CuO. The ferrite powder can be obtained by uniformly mixing oxide powder ingredients, calcining the mixture at 750° C. to 950° C. for two hours, and pulverizing the calcined product. The use of a ferrite powder having a cumulative 50% volume diameter of 0.5 to 1.0 μm is preferred.

A method for producing the molded ferrite sheet according to the present invention will be next described.

Although the method for obtaining the molded ferrite sheet of the present invention is not specifically limited, a sandblasting method, which is widely used in the field of metal polishing, can be used for roughening a surface of the molded ferrite sheet of the present invention. That is, the molded ferrite sheet with a roughened surface can be obtained by injecting an aqueous solution in which a polishing material such as glass or alumina is dispersed onto a molded ferrite sheet and then washing the molded ferrite sheet with water.

In another method for obtaining the molded ferrite sheet of the present invention, a melt of a mixture of a ferrite powder and a thermoplastic plastic is used. The melt is molded into a sheet under pressure using a calender roll or mold having a treated (roughened) surface. Examples of usable thermoplastic resins include polyethylene (PE), polypropylene (PP) and polyvinyl butyral (PVB). A thermoplastic plastic elastomer such as styrene-ethylene-butylenes-based resins and olefin-based resins can be also used. When necessary, two or more thermoplastic resins and/or thermoplastic plastic elastomer may be used in combination. A mixture of 1000 parts by weight of a coupling agent-treated ferrite powder, obtained by treating 1000 parts by weight of a ferrite powder with 10 to 50 parts by weight of a coupling agent, and 70 to 120 parts by weight of a resin is kneaded in a pressure kneader or the like kneading device at 120 to 140° C. for 20 to 60 minutes and the kneaded mixture is formed by molding under pressure using mold having a roughened surface. It is preferred to use a low-density polyethylene (LDPE) or polyvinyl butyral (PVB) since they are decomposed during sintering. The thermoplastic resin is preferably used in an amount of 70 to 110 parts by weight per 1000 parts by weight of the coupling agent-treated ferrite.

A further method for obtaining the molded ferrite sheet of the present invention is to apply a coating of a ferrite-dispersed coating liquid to a surface of a plastic film. The ferrite-dispersed coating liquid is preferably composed of 1000 parts by weight of an Ni—Zn—Cu ferrite powder, 70 to 120 parts by weight of a polyvinyl alcohol resin, 15 to 25 parts by weight of butyl butylphthalate as a plasticizer and 400 to 600 parts by weight of a solvent. Examples of usable solvents include glycol ether solvents, MEK, toluene, methanol, ethanol and n-butanol. In view of the dispersiblity of the ferrite powder and for ease of mixing and drying, the coating liquid is preferably composed of 1000 parts by weight of ferrite, 80 to 110 parts by weight of a polybutyral resin, 18 to 22 parts by weight of butyl butylphthalate and 450 to 550 parts by weight of a solvent.

The method for preparing the coating liquid is not specifically limited but the use of a ball mill is preferred. When the solvent and ferrite are first mixed in a ball mill and then the mixture is mixed with the resin and plasticizer, a uniform coating liquid can be obtained. It is important that the thus obtained coating liquid should be subjected to vacuum defoaming in a vacuum vessel sufficiently to prevent cracking of the coated film during drying.

The method for coating the ferrite-dispersed coating liquid is not specifically limited. A roll coater or doctor blade can be used. The use of a doctor blade is preferred since it can form a layer with high thickness accuracy and does not affect the stability of the coating liquid. The coating liquid is applied to a plastic film with a doctor blade to form a layer of a desired thickness. The applied layer is then dried at 80 to 130° C. for 30 to 60 minutes to obtain a molded ferrite sheet.

The plastic film on which the ferrite-dispersed coating liquid is to be applied is not specifically limited. A sandblasted polyethylene (PE), polypropylene (PP), polyethylene terephthalate (PET) or polyimide film can be suitably used. The use of a polyethylene terephthalate (PET) film is preferred for ease of surface treatment and thermal stability during the coating and drying processes. When a sandblasted plastic film is used, the surface roughness (surface irregularities) of the plastic film can be transferred to the molded ferrite sheet, whereby a molded sheet having a desired surface roughness can be obtained.

Yet a further method for obtaining the molded ferrite sheet of the present invention is to control the surface roughness of the molded ferrite sheet by adjusting the particle diameter of the ferrite powder. When a mixture of 100 parts by weight of a ferrite powder having a cumulative 50% volume diameter of 0.1 to 1.0 μm and 5 to 40 parts by weight of a ferrite powder having a cumulative 50% volume diameter of 3 to 10 μm is used to form a ferrite-dispersed coating liquid, a molded ferrite sheet having a surface roughness as required in the present invention can be obtained by applying the coating liquid to a surface of a support. The support may be a sandblasted plastic film. However, the required surface roughness may be obtained even when the support has not been sandblasted. In view of the surface roughness of the sheet, it is preferred to mix 100 parts by weight of a ferrite powder having a cumulative 50% volume diameter of 0.3 to 0.7 μm with 10 to 40 parts by weight of a ferrite powder having a cumulative 50% volume diameter of 3 to 7 μm.

In the present invention, the molded ferrite sheet is heat-treated to obtain a sintered ferrite substrate.

In the heat treatment, 5 to 20 molded ferrite sheets of the present invention are generally stacked on an alumina support plate having a porosity of 30% and sintered at a time in an electric furnace or the like. It is important to control the heat treatment conditions so that removal of the resin component and growth of the ferrite particles proceed effectively. To remove the resin component, the molded ferrite sheets are preferably maintained at 150° C. to 550° C. for 5 to 80 hours. To grow the ferrite particles, the molded ferrite sheets are then preferably maintained at 850° C. to 1200° C. for 1 to 5 hours.

To prevent thermal deformation and/or cracking of the sheets, it is preferred that the temperature be raised from room temperature at a rate of 10 to 20° C./hour and then maintained constant in the process of removing the resin component. It is also preferred that the temperature be then raised at a rate of 30 to 60° C./hour, maintained constant to sinter the molded ferrite sheets until the ferrite particles grows sufficiently. The sintered product is then gradually cooled. The retention time and temperature in each process are suitably selected depending on the number of the molded ferrite sheets to be treated.

The sintered ferrite substrate according to the present invention will be next described.

The sintered ferrite substrate of the present invention has a surface roughness such that the center line average roughness (Ra) is in a range of 150 to 700 nm and the maximum height (Rmax) is in a range of 2 to 9 μm. Preferably, the center line average roughness (Ra) is in a range of 160 to 600 nm and the maximum height is in a range of 3 to 8 μm.

In addition, the area occupancy rate of cross-sectional area taken along a horizontal plane at a depth of 50% of the maximum height in a square of side 100 μm is in a range of 5 to 70%, preferably in a range of 10 to 60%, more preferably in a range of 10 to 50%.

When the molded ferrite sheet as described before is sintered, a sintered ferrite substrate having a center line average roughness (Ra) of not less than 150 nm and a maximum height (Rmax) of not less than 2 μm can be obtained. When the center line average roughness (Ra) is greater than 700 nm or the maximum height (Rmax) is greater than 9 μm, the sintered ferrite substrate lacks surface smoothness and breaks easily. Also, gaps tend to be formed between the sintered ferrite substrate and an insulator film or a conductive layer provided thereon, resulting in poor antenna characteristics. Further, the resulting sintered ferrite substrate has only a small sintered cross-sectional area and thus has a low magnetic permeability. The surface roughness is critical especially when the sintered ferrite substrate has a small thickness of 200 μm or less.

When the molded ferrite sheet as described before is sintered, the area occupancy rate of cross-sectional area taken along a horizontal plane at a depth of 50% of the maximum height in a square of side 100 μm will be in a range of 5 to 70%.

The sintered ferrite substrate according to the present invention preferably has a sintered density in a range of 4.6 to 5.0 g/cm³. When the sintered ferrite substrate has a sintered density below 4.4 g/cm³, it is not sufficiently sintered. In this case, the sintered ferrite substrate breaks easily and has a magnetic permeability with a low real part μr. However, it is not necessary to sinter the molded ferrite sheet until the sintered density exceeds 5.0 g/cm³. The sintered density is more preferably in a range of 4.5 to 4.9 g/cm³.

Bendability may be suitably imparted to the sintered ferrite substrate of the present invention by dividing the substrate into parts with an adhesive film provided on at least one side thereof. When the sintered ferrite substrate is divided into parts, its magnetic permeability is lowered. However, the magnetic permeability changes depending on how it is divided. Thus, when grooves are formed in a surface of the substrate at regular intervals so that the sintered ferrite substrate can be easily divided along the grooves, the magnetic characteristics of the sintered ferrite substrate divided into parts and provided with bendability can be stabilized.

To provide the sintered ferrite substrate of the present invention with grooves, V-shaped grooves with an apex angle of 25 to 45 degrees may be formed in one side of the molded sheet with an embossing roll or metal blade. The grooves are formed such that the distance between the bottoms of the adjacent two grooves is in a range of 1 to 5 mm. When the distance is less than 1 mm, the magnetic permeability is lowered when the sintered ferrite substrate is divided along the grooves. Further, such narrow spaced grooves are difficult to form. On the other hand, when the distance is greater than 5 mm, the sintered ferrite substrate cannot have sufficient flexibility. The distance between the grooves is preferably in a range of 2 to 4 mm.

The depth of the grooves is in a range of 0.4 to 0.7 as expressed in terms of the ratio of the depth to the thickness of the molded sheet (groove depth/sheet thickness ratio). When the groove depth/sheet thickness ratio is less than 0.4, the sintered ferrite substrate may not be divided along the grooves but be broken irregularly, resulting in unstable magnetic permeability. When the groove depth is greater than 0.7, the molded ferrite sheet may be broken along the grooves during sintering. Preferably, the groove depth/sheet thickness ratio is in a range of 0.4 to 0.6.

The pattern of the grooves to be formed in a sheet surface may be any suitable pattern such as equilateral triangles, grids or polygons. It is important that when the sintered ferrite substrate is divided into parts along the grooves, the parts should be as uniform as possible in size and shape and that the magnetic permeability of the substrate should hardly change even when the resulting substrate is bent.

The sintered ferrite substrate of the present invention is thin and breaks easily. However, it has been found that when the sintered ferrite substrate produced from an Ni—Zn—Cu spinel ferrite powder is divided into parts with an adhesive protective film provided on at least one side thereof, and when the real part μr' and the imaginary part μr'' of the magnetic permeability at 13.56 MHz are maintained at not less than 80 and not greater than 20, respectively, the sintered ferrite substrate has adequate flexibility and is very excellent as a thin sintered ferrite substrate with a thickness in a range of 25 to 360 μm for a loop antenna module.

When the real part μr' of the magnetic permeability of the sintered ferrite substrate made from an Ni—Zn—Cu spinel ferrite powder is less than 80, the resulting antenna module has a low coil inductance and can transmit and receive radio waves over only a short distance. When the imaginary part μr'' of the magnetic permeability is greater than 20, loss will increase and the antenna has a low resonance Q and can transmit and receive radio waves over only a short distance. The imaginary part μr'' is preferably not greater than 10, more preferably not greater than 5.

It has been found that when a sintered ferrite substrate is produced from an Mg—Zn—Cu spinel ferrite powder, and when the real part μr' and imaginary part μr'' of the magnetic permeability at 13.56 MHz are maintained at not less than 80 and not greater than 100, respectively, the sintered ferrite substrate has suitable flexibility and is very excellent as a thin sintered ferrite substrate with a thickness of 25 to 360 μm for a loop antenna module.

When the real part µr' of the magnetic permeability of the sintered ferrite substrate made from an Mg—Zn—Cu spinel ferrite powder is less than 80, the resulting antenna module has a low coil inductance and can transmit and receive radio waves over only a short distance. When the imaginary part µr" of the magnetic permeability is greater than 150, loss will increase and the antenna has a low resonance Q and can transmit and receive radio waves over only a short distance. The real part µr' and the imaginary part µr" of the magnetic permeability are preferably not less than 85 and not greater than 90, respectively.

An antenna module according to the present invention will be next described.

The antenna module of the present invention comprises a sintered ferrite substrate as a magnetic member, a conductive loop antenna provided on one side of the sintered ferrite substrate, and a conductive layer provided on opposite side of the sintered ferrite substrate from the antenna. The conductive loop antenna comprises an insulator film, such as polyimide film or PET film, with a thickness in a range of 20 to 60 µm and a spiral conductive loop with a thickness in a range of 20 to 30 µm provided on one side of the insulator film.

The conductive layer may be formed on a sintered ferrite substrate with a thickness in a range of 25 to 360 µm by coating a conductive paint on one side thereof and drying the coated paint. Alternatively, the conductively layer may be formed by forming a print of a silver paste on a molded ferrite sheet and sintering and integrating the silver paste print and the molded ferrite sheet together. The conductive layer preferably has a thickness in a range of 5 to 50 µm. When the conductive loop antenna is attached to opposite side of the sintered ferrite substrate from the conductive layer with a double coated adhesive tape having a thickness in a range of 20 to 60 µm and when the same adhesive tape is provided on the conductive layer, an antenna module with a total thickness in a range of 110 to 620 µm as shown in FIG. 1 can be obtained.

The insulator film is not specifically limited but preferably has a surface electric resistance of not less than 5 MΩ/square, preferably not less than 10 MΩ/square, to prevent minute leakage current.

The conductive paint may be prepared by dispersing copper or silver powder as a conductive filler in a mixture of an acrylic resin or epoxy resin and an organic solvent such as butyl acetate or toluene.

The conductive paint is applied to one side of the sintered ferrite substrate and dried and cured in atmosphere at a temperature of room temperature to 100° C. for 30 minutes to 3 hours to form a conductive layer with a thickness in a range of 20 to 50 µm. The conductive layer preferably has a surface electric resistance of not greater than 3 Ω/square. To reduce changes in antenna characteristics when the antenna module is placed in the vicinity of a metal component, the surface electric resistance is desired to be not greater than 1 Ω/square. The thickness of the conductive layer may be in the range of 20 to 30 µm to reduce the total thickness of the antenna module.

A sintered ferrite substrate with a conductive layer can be obtained by sintering and integrating a molded ferrite sheet and a conductive paste layer provided on one side of the molded ferrite sheet by a green sheet method. To prevent the conductive layer from exposing in an electronic device, an insulating protective film may be provided thereon. A capacitor is connected in parallel to the loop to adjust and tune the thus obtained antenna module to a resonant frequency of to 13.56 MHz as is well known in the art so that the antenna module can resonate at a desired frequency.

The antenna module having a conductive loop antenna, an adhesive layer, a sintered ferrite substrate and a conductive layer which are closely bonded and integrated together and a capacitor connected in parallel to the loop circuit to tune the resonant frequency of the antenna module to 13.56 MHz as described above undergoes no significant change in its antenna characteristics and can provide stable radio communication even when placed in the vicinity of a metal component of an electronic device of various types.

According to the present invention, clean and thin molded ferrite sheets which are not stuck or bonded without any previous releasing treatment using a zirconia powder or alumina powder, and sintered ferrite substrates free of releasing powder which may contaminate electronic devices in which they are used can be provided.

According to the preferred embodiment of the present invention, the sintered ferrite substrate having a thickness in a range of 25 to 360 µm and a magnetic permeability with a real part µr' and an imaginary part µr" of not less than 80 and not greater than 20, respectively (when the ferrite is an Ni—Zn—Cu spinel ferrite) or not less than 80 and not greater than 100, respectively (when the ferrite is an Mg—Zn—Cu spinel ferrite), at 13.56 MHz can be suitably used as a magnetic member for an antenna module. The sintered ferrite substrate can contribute significantly to the reduction in thickness of an antenna module.

According to the preferred embodiment the of present invention, since a thin conductive layer is formed by a coating or printing method on a sintered ferrite substrate as a magnetic member of an antenna module to be used in the vicinity of a metal component, the total thickness of the antenna module can be as small as 100 to 580 µm. Also, according to the present invention, since the resonant frequency is adjusted after the conductive loop coil, magnetic member (soft magnetic layer) and conductive layer have been integrated together, the antenna undergoes little change in its characteristics after being incorporated in a device. Thus, it requires no complicated adjustment after being incorporated in a device.

According to the preferred embodiment of the present invention, since no gap can be formed between a magnetic member and a conductive layer in an antenna module to be used in the vicinity of a metal component, the antenna module has very stable antenna characteristics.

According to the preferred embodiment of the present invention, since the sintered ferrite substrate as a magnetic member is provided with an adhesive film on at least one side thereof and is divided into parts to provide it with bendability, the antenna module is easy to handle and changes in characteristics of the antenna module caused by breaking of the magnetic member can be minimized.

According to the present invention, since a desired roughness can be easily imparted to at least a surface of the molded ferrite sheet, molded ferrite sheets which are not bonded even if sintered in a stack without using a releasing powder can be produced industrially.

The sintered ferrite substrate according to the present invention has a relatively small thickness but has a high magnetic permeability. In addition, since a plurality of such sintered ferrite substrates can be sintered in a stack without using a releasing powder such as zirconia or alumina powder, the sintered ferrite substrate does not cause contamination by such a powder when being incorporated in an electronic device. Therefore, the sintered ferrite substrate is highly suitable as a magnetic core of a high-density mounted antenna module for RFID (Radio Frequency Identification) tags, which are widely used in recent years.

An antenna module obtained by integrally combining a sintered ferrite substrate of the present invention provided with a conductive layer with a thickness in a range of 20 to 50 µm on one side thereof and a conductive loop antenna does not undergo any significant change in characteristics even when incorporated in an electronic device for RFID (Radio Frequency Identification) communication and placed in the vicinity of a metal component and has a relatively small thickness. Therefore, the antenna module can meet the demand for high-density mounting of electronic devices.

EXAMPLES

The measurement methods used in the following examples will be described.

Surface Roughness:

The surface roughnesses of the molded ferrite sheet and sintered ferrite substrate were determined by measuring the center line average roughness Ra and maximum height Rmax in a region of a square of side 100 µm using an atomic force microscope AFM (Nano Scope III, manufactured by Digital Instrument).

To determine the surface irregularity in terms of height distribution, bearing analysis software of the apparatus was used. When the area occupancy rate of cross-sectional area taken along a horizontal plane at a depth of 50% of the maximum height (Rmax) in a square of side 100 µm is obtained on the image used to obtain the surface roughness, the surface profile can be compared with that of other samples. When the area occupancy rate is in a range of 10 to 80%, sticking or bonding of the molded ferrite sheets during sintering can be prevented. When the area occupancy rates of sintered ferrite substrates after sintering were measured, sintered ferrite substrates which were not stuck to each other had an area occupancy rate in a range of 5 to 70%. The surface roughness of a sintered ferrite substrate of Comparative Examples which was stuck heavily was measured at portion on a broken piece where no sticking occurred.

Cumulative 50% Volume Diameter:

The average particle diameter of the ferrite powder was measured by a wet method using Microtrack MT3300 manufactured by Nikkiso Co. Ltd. 5 Gram of the ferrite powder was added to 100 ml of an aqueous solution containing 0.2% of hexametaphosphoric acid as a dispersant and 0.05% of a nonionic surfactant (Triton X-100 manufactured by Dow Chemical Company) as a surfactant and the resulting mixture was dispersed for 300 seconds using an ultrasonic homogenizer (Type 300W manufactured by Nikkiso Co. Ltd.). Then, the volumetric distribution was measured under the following conditions; measuring time: 30 seconds, measurement range: from 0.021 to 1408 µm, solvent refractive index: 1.33, particle refractive index: 2.94 and particle shape: nonspherical.

Sheet Thickness:

The thicknesses of the four corners of a sample piece with an external size of 80 mm×80 mm cut from the molded sheet were measured with Digimatic Indicator ID-S112 manufactured by Mitsutoyo Corporation and the average of the thicknesses was taken as the thickness of the sheet.

Sintered Density:

The sintered density of the sintered ferrite substrate was calculated from its volume obtained from outer dimensions thereof and its weight.

Magnetic Permeability:

The sintered ferrite substrate was cut into a test piece having a ring shape with an outer diameter of 14 mm and an inner diameter of 8 mm and its thickness was measured. The magnetic permeability of the test piece at a frequency of 13.56 MHz was measured using an Impedance Analyzer HP4291A (manufactured by Hewlett-Packard Development Company) and a jig (HP1645A) attached to the test station thereof or Impedance Analyzer (E4991A manufactured by Agilent Technologies Co., Ltd.) and a jig (16454A) attached to its test station.

Resonant Frequency and Degree of Resonance:

The resonance characteristics of the antenna module were obtained by measuring the resonance characteristics of a conductive loop antenna having a structure as shown in FIG. 1. The frequency characteristics of the impedance of the power supply line for the laminated antenna module configured as shown in FIG. 1 were measured. A capacitor was connected in parallel to the power supply line and its capacitance was adjusted. Then, when the resonant frequency became 13.56 MHz, the degree of resonance Q was measured using an impedance analyzer HP4291A manufactured by Hewlett-Packard Development Company. In Examples 7 to 9 and 16 to 18, and Comparative Examples 6 to 8 and 14 to 16, the resonant frequency and the degree of resonance Q were measured under the same conditions as those set for the case where no iron plate was laminated for comparison.

Surface Electric Resistance:

The surface electric resistance of the conductive layer was measured by a four probe method (according to JISK 7149) using an electric resistivity meter Loresta-GP (MCP-T600 manufactured by Mitsubishi Chemical Corporation).

Example 1

Using a pressure kneader, 1,000 parts by weight of a ferrite powder, obtained by surface-treating 1,000 parts by weight of Ni—Zn—Cu ferrite powder (composition: $Fe_2O_3$: 48.5 mol %, NiO: 20.5 mol %, ZnO: 20.5 mol %, CuO: 10.5 mol %; calcinations conditions: 850° C., 90 minutes; cumulative 50% volume diameter: adjusted to 0.7 µm) with 10 parts by weight of a titanate-based coupling agent (KR-TTS manufactured by Ajinomoto Co., Inc.), 50 parts by weight of a thermoplastic elastomer (LUMITAC 22-1 manufactured by Tosoh Corporation), 100 parts by weight of polyethylene having a density of 0.9 g/cm³ and 20 parts by weight of stearic acid were kneaded at 130° C. for 40 minutes. The thus obtained kneaded mass of a ferrite resin composition was press molded at a temperature of 160° C. under a pressure of 100 kg/cm² for a pressurization time of 3 minutes using an iron plate, which had been sandblasted to have a center line average roughness of 450 nm and a maximum height of 8 µm, to obtain a molded ferrite sheet having a thickness of 77 µm and a size of 100 mm square. Ten such sheets were prepared and stacked one upon another. The stacked substrates were placed between top and bottom alumina setters (manufactured by Kikusui Chemical Industries Co., Ltd.) as support plate means and heated at 500° C. for 10 hours for removing the organic binder, followed by sintering at 920° C. for 2 hours to obtain sintered substrates. After cooling, the sintered substrates were peeled from each other. It was found that the sintered substrate was able to be easily peeled off without causing any damage. The sintered substrate had a thickness of 65 µm and an outer dimension of 80 mm square. A test piece having an outer diameter of 14 mm and an inner diameter of 8 mm was cut out from the substrate and measured for its magnetic permeability using Impedance Analyzer (HP4291A manufactured by Hewlett-Packard Inc.) and a jig (HP16454A) attached to its test station. It was found that µr' and µr" were 98 and 2.2, respectively, at 13.56 MHz. Thus, the obtained sintered ferrite substrates were not stuck to each other and had good magnetic characteristics.

The above-obtained molded ferrite sheet was found to have a surface roughness such that the center line average roughness was 420 nm, the maximum height was 6.5 μm and an area occupancy rate of the cross-sectional area, taken along a horizontal plane at a depth of 50% of the maximum height in a square of side 100 μm, was 48%. The obtained sintered ferrite substrate was found to have a surface roughness such that the center line average roughness was 400 nm, the maximum height was 5.5 μm and an area occupancy rate of the cross-sectional area, taken along a horizontal plane at a depth of 50% of the maximum height in a square of side 100 μm, was 45%.

Example 2

Using a ball mill, 100 parts by weight of the same Ni—Zn—Cu ferrite as used in Example 1, 2 parts by weight of butyl phthalyl butyl glycolate, 12 parts of a polyvinylalcohol resin (ESLEK B BM-1 manufactured by Sekisui Chemical Co., Ltd.) and 60 parts by weight of a mixed solvent composed of 4 parts of n-butanol and 6 parts of toluene were mixed, dissolved or dispersed to obtain a ferrite-dispersed coating liquid. The ferrite-dispersed coating liquid was defoamed by an oil rotary vacuum pump and uniformly applied with a doctor blade to a PET film (LUMIMAT 50S200 TRES manufactured by Panak Co., Ltd.), one side of which had been sandblasted to have a center line average roughness of 530 nm and a maximum height of 5.6 μm, to a given thickness. The coating was dried with hot wind at 100° C. for 30 minutes to obtain a molded ferrite sheet having a thickness of 204 μm. The molded ferrite sheet was cut into squares of side 100 mm. Each of the cut sheets was peeled off from the PET film. The sheets were then sintered in the same conditions as those in Example 1 to obtain sintered ferrite substrates. The obtained sintered ferrite substrate was evaluated for its physical properties and was found to have a thickness of 160 μm, an outer dimension of 80 mm square and magnetic permeability with $\mu r'$ of 96 and $\mu r''$ of 3. Further, the obtained sintered ferrite substrates did not stick to each other and were easily peeled off from each other.

The above-obtained molded ferrite sheet was found to have a surface roughness such that the center line average roughness was 370 nm, the maximum height was 4.0 μm and an area occupancy rate of the cross-sectional area, taken along a horizontal plane at a depth of 50% of the maximum height in a square of side 100 μm, was 73%. The surface of the above-obtained molded ferrite sheet which had not been brought into contact with the PET film was found to have a center line average roughness of 104 nm, a maximum height of 1.3 μm and an area occupancy rate of the cross-sectional area, taken along a horizontal plane at a depth of 50% of the maximum height in a square of side 100 μm, of 93%. Thus, it was understood that the surface roughness was able to be controlled at will by the PET film used. The above-obtained molded ferrite sheet was found to have a surface roughness such that the center line average roughness was 292 nm, the maximum height was 3.5 μm and an area occupancy rate of the cross-sectional area, taken along a horizontal plane at a depth of 50% of the maximum height in a square of side 100 μm, was 12%.

Example 3

A kneaded mass of a ferrite resin composition was prepared in the same manner as that in Example 1 except that a mixture of 300 parts by weight of Ni—Zn—Cu ferrite powder (composition: $Fe_2O_3$: 48.5 mol %, NiO: 20.5 mol %, ZnO: 20.5 mol %, CuO: 10.5 mol %; calcination conditions: 1,000° C., 90 minutes; cumulative 50% volume diameter: 6 μm) and 700 parts by weight of the same Ni—Zn—Cu ferrite powder (cumulative 50% volume diameter: 0.7 μm) as used in Example 1 was used. The thus obtained kneaded mass was press molded at a temperature of 160° C. under a pressure of 100 kg/cm² for a pressurization time of 3 minutes using an iron plate, which had been processed to have a center line average roughness of 120 nm and a maximum roughness of 2 μm, to obtain a molded ferrite sheet having a thickness of 200 μm and an outer size of 100 mm. Using the thus obtained sheet, sintered ferrite substrates were prepared in the same manner as that in Example 1. The obtained sintered ferrite substrate was evaluated for its physical properties and was found to have a thickness of 167 μm and magnetic permeability with $\mu r'$ of 80 and $\mu r''$ of 1.1 at 13.56 MHz. Further, the substrates did not stick to each other and were easily peeled off from each other.

Because of the use of coarse particle ferrite, the above-obtained molded ferrite sheet had a center line average roughness of 270 nm, a maximum height of 5.0 μm and an area occupancy rate of the cross-sectional area, taken along a horizontal plane at a depth of 50% of the maximum height in a square of side 100 μm, of 20%. The sintered ferrite substrate had surface roughness such that the center line average roughness was 250 nm, the maximum height was 4.0 μm and the area occupancy rate of the cross-sectional area, taken along a horizontal plane at a depth of 50% of the maximum height in a square of side 100 μm, was 18%.

Example 4

Sintered ferrite substrates were obtained in the same manner as that in Example 2 except that the application of the ferrite-dispersed coating liquid using the doctor blade was carried out under conditions so that a molded ferrite sheet obtained had a thickness of 42 μm. The obtained sintered ferrite substrate was evaluated for its physical properties and was found to have a thickness of 37 μm and magnetic permeability with $\mu r'$ of 95 and $\mu r''$ of 2 at 13.56 MHz. Further, the substrates did not stick to each other and were easily peeled off from each other.

The obtained molded ferrite sheet had surface roughness such that the center line average roughness of 435 nm, the maximum height of 6.3 μm and the area occupancy rate of the cross-sectional area, taken along a horizontal plane at a depth of 50% of the maximum height in a square of side 100 μm, was 52%. The sintered ferrite substrate had surface roughness such that the center line average roughness was 425 nm, the maximum height was 4.9 μm and the area occupancy rate of the cross-sectional area, taken along a horizontal plane at a depth of 50% of the maximum height in a square of side 100 μm, was 50%.

Example 5

Sintered ferrite substrates were obtained in the same manner as that in Example 2 except that the application of the ferrite-dispersed coating liquid using the doctor blade was carried out under conditions so that a molded ferrite sheet obtained had a thickness of 405 μm. The obtained sintered ferrite substrate was evaluated for its physical properties and was found to have a thickness of 350 μm and magnetic permeability with $\mu r'$ of 102 and $\mu r''$ of 3.2 at 13.56 MHz. Further, the substrates did not stick to each other and was easily peeled off from each other.

The obtained molded ferrite sheet had surface roughness such that the center line average roughness of 409 nm, the maximum height of 6.8 μm and the area occupancy rate of the cross-sectional area, taken along a horizontal plane at a depth of 50% of the maximum height in a square of side 100 μm, was 58%. The sintered ferrite substrate had surface roughness such that the center line average roughness was 388 nm, the maximum height was 5.6 μm and the area occupancy rate of the cross-sectional area, taken along a horizontal plane at a depth of 50% of the maximum height in a square of side 100 μm, was 41%.

Comparative Example 1

A kneaded mass of a ferrite resin composition was prepared in the same manner as that in Example 1. Using the kneaded mass, sintered ferrite substrates were prepared in the same manner as that in Example 1 except that an iron plate processed to have a center line average roughness of 120 nm and a maximum roughness of 2 μm was used in the press molding. The substrates stuck so tightly to each other that it was difficult to peel off the substrates from each other. Although the substrate was partly unstuck from each other, breakage occurred when it was forcibly separated therefrom. Thus, no sintered ferrite substrates having a size of 80 mm square were obtained. The obtained sintered ferrite substrate had magnetic permeability with μr' of 98 and μr" of 1.9 at 13.56 MHz.

The obtained molded ferrite sheet had surface roughness such that the center line average roughness of 115 nm, the maximum height of 1.8 μm and the area occupancy rate of the cross-sectional area, taken along a horizontal plane at a depth of 50% of the maximum height in a square of side 100 μm, was 2%. The sintered ferrite substrate had surface roughness such that the center line average roughness was 98 nm, the maximum height was 1.1 μm and the area occupancy rate of the cross-sectional area, taken along a horizontal plane at a depth of 50% of the maximum height in a square of side 100 μm, was 2%.

Comparative Example 2

A ferrite-dispersed coating liquid was prepared in the same manner as that in Example 2. The obtained coating liquid was uniformly applied with a doctor blade to a PET film (not sandblasted) having a center line average roughness of 17 nm, a maximum height of 0.3 μm and a thickness of 50 μm. This was dried with hot wind at 100° C. for 30 minutes to obtain a molded ferrite sheet having a thickness of 202 μm. The sheet was peeled off from the PET film. Ten such sheets were stacked one upon another and heated in the same manner as that in Example 1 to obtain sintered ferrite substrates. The obtained substrate was evaluated for its properties and was found to have a thickness of 165 μm. Since the substrates stuck so tightly to each other it was not possible to peel off the substrates from each other.

The obtained molded ferrite sheet had surface roughness such that the center line average roughness of 66 nm, the maximum height of 1.3 μm and the area occupancy rate of the cross-sectional area, taken along a horizontal plane at a depth of 50% of the maximum height in a square of side 100 μm, was 90%. The sintered ferrite substrate had surface roughness such that the center line average roughness was 44 nm, the maximum height was 0.9 μm and the area occupancy rate of the cross-sectional area, taken along a horizontal plane at a depth of 50% of the maximum height in a square of side 100 μm, was 1%.

Comparative Example 3

A sheet was prepared in the same manner as that in Comparative Example 2 and was peeled off from the PET film. That surface of the molded ferrite sheet which had been in contact with the PET film was applied with 50 mg of zirconia powder having an average particle diameter of 5 μm by brushing. Thereafter, a calcination treatment was carried out in the same manner as that in Comparative Example 2 to obtain sintered ferrite substrates. The evaluation of the sintered ferrite substrate revealed that the substrate had magnetic permeability with μr' of 96 and μr" of 1.8 at 13.56 MHz. The obtained sintered ferrite substrates had deposits of zirconia powder. During the removal of the zirconia powder deposits using a brush, three of the ten substrates were broken. The application of the powder and the removal of the powder were significantly troublesome. The powder deposits were not able to be completely removed.

Comparative Example 4

Sintered ferrite substrates were prepared in the same manner as that in Example 1 except that an iron plate processed to have a center line average roughness of 1200 nm and a maximum height of 14 μm was used in the press molding. The substrates did not stuck to each other and were able to be peeled off from each other. The obtained sintered ferrite substrate had magnetic permeability with μr' of 75 and μr" of 0.6 at 13.56 MHz and, thus, did not have satisfactory magnetic characteristics. Such deterioration of the magnetic permeability is considered to be attributed to the high surface roughness of the iron plate which resulted in an increase of void spaces in the cross-sections of the sintered ferrite substrate.

Comparative Example 5

A ferrite-dispersed coating liquid was prepared in the same manner as that in Example 2. The obtained coating liquid was uniformly applied with a doctor blade to a PET film (U4-50 manufactured by Teijin DuPont Co., Ltd) which had been processed to have a center line average roughness of 252 nm and a maximum height of 3.3 μm. The coating was dried with hot wind at 100° C. for 30 minutes to obtain a molded ferrite sheet having a thickness of 200 μm. The sheet was peeled off from the PET film. Ten such sheets were stacked one upon another and heat-treated in the same manner as that in Example 1 to obtain sintered ferrite substrates. The obtained substrate was evaluated for its properties and was found to have a thickness of 171 μm. Since the substrates stuck so tightly to each other it was not possible to peel off the substrates from each other. The obtained molded ferrite sheet had surface roughness such that the center line average roughness of 319 nm, the maximum height of 3.3 μm and the area occupancy rate of the cross-sectional area, taken along a horizontal plane at a depth of 50% of the maximum height in a square of side 100 μm, was 95%. The sintered ferrite substrate had surface roughness such that the center line average roughness was 246 nm, the maximum height was 3.3 μm and the area occupancy rate of the cross-sectional area, taken along a horizontal plane at a depth of 50% of the maximum height in a square of side 100 μm, was 96%.

It will be understood from above results that not only control of the surface roughness but also control of the area occupancy rate of the cross-sectional area is important in order to obtain the effects of the present invention.

TABLE 1

| | Thickness (μm) | Surface Roughness Ra (nm) | Surface Roughness Rmax (μm) | Bearing Analysis Data Area Rate* (%) |
|---|---|---|---|---|
| *Molded Ferrite Sheet* | | | | |
| Example 1 | 77 | 420 | 6.5 | 48 |
| Example 2 | 204 | 370 | 4.0 | 73 |
| Example 3 | 200 | 270 | 5.0 | 20 |
| Example 4 | 42 | 435 | 6.3 | 52 |
| Example 5 | 405 | 409 | 6.8 | 58 |
| Comparative Example 1 | 78 | 115 | 1.8 | 2 |
| Comparative Example 2 | 202 | 66 | 1.3 | 90 |
| Comparative Example 3 | 199 | 68 | 1.1 | 2 |
| Comparative Example 4 | 49 | 1120 | 12.5 | 23 |
| Comparative Example 5 | 200 | 319 | 3.3 | 95 |
| *Sintered Ferrite Substrate* | | | | |
| Example 1 | 63 | 400 | 5.5 | 45 |
| Example 2 | 170 | 292 | 3.5 | 12 |
| Example 3 | 167 | 250 | 4.0 | 18 |
| Example 4 | 37 | 425 | 4.9 | 50 |
| Example 5 | 350 | 388 | 5.6 | 41 |
| Comparative Example 1 | 66 | 98 | 1.1 | 2 |
| Comparative Example 2 | 165 | 44 | 0.9 | 1 |
| Comparative Example 3 | 166 | 51 | 0.8 | 2 |
| Comparative Example 4 | 40 | 980 | 9.6 | 24 |
| Comparative Example 5 | 171 | 246 | 3.3 | 96 |

| | Sintered Ferrite Substrate Sticking State | Magnetic Permeability μr' | Magnetic Permeability μr" |
|---|---|---|---|
| Example 1 | No sticking | 98 | 2.2 |
| Example 2 | No sticking | 96 | 3 |
| Example 3 | No sticking | 80 | 1.1 |
| Example 4 | No sticking | 95 | 2 |
| Example 5 | No sticking | 102 | 3.2 |
| Comparative Example 1 | Stuck | 98 | 1.9 |
| Comparative Example 2 | stuck | 97 | 2.3 |
| Comparative Example 3 | Partly stuck | 96 | 1.8 |
| Comparative Example 4 | No sticking | 75 | 0.6 |
| Comparative Example 5 | stuck | 99 | 2.2 |

*Area occupancy rate of the cross-sectional area, taken along a horizontal plane at a depth of 50% of the maximum height Example 6

A double coated adhesive tape (Product name: 467 MP, manufactured by Sumitomo 3M Limited) having a thickness of 50 μm was adhered onto the surface of the sintered ferrite substrate of Example 1 to which roughness had been imparted, thereby obtaining a laminate composed of a sintered ferrite substrate layer of 63 μm thick and a adhesive layer of 50 μm thick. For the purpose of imparting the laminate with bendability, the laminate was placed on an urethane foam sheet having a thickness of 10 mm and an expansion ratio of about 10-fold and was then pressed with a rubber roller having an outer dimension of about 50 mm and a width of about 15 cm. The rubber roller was displaced in the X and Y directions of the laminate with a roll linear pressure of about 1 kg/cm so that cracks were formed throughout the sintered ferrite substrate. A test piece having an outer diameter of 14 mm and an inner diameter of 8 mm was cut out and measured for its magnetic permeability. The magnetic permeability was found to have μr' of 83 and μr" of 0.8 at 13.56 MHz. Also, the similar laminate was wound around an iron rod having an outer diameter of 30 mm. In the same manner as above, a test piece was cut out and measured for its magnetic permeability. The magnetic permeability was found to have μr' of 82.5 and μr" of 0.8 at 13.56 MHz and was similar to the above. Thus, the obtained laminates had good bendability and good magnetic permeability μr' of more than 80.

Example 7

A planar antenna composed of a PET film with a thickness of 25 μm and a 7-turn spiral conductive loop provided on the PET film was prepared. The loop had a rectangular shape with a length of 45 mm and a width of 75 mm. A molded ferrite sheet having a thickness of 180 μm was prepared in the same manner as that in Example 2 using the same Ni—Zn—Cu ferrite as used in Example 1. Using a Thomson blade having V-shaped edges of each 30°, V-shaped grooves with a depth of about 90 μm are formed on one side of the molded sheet. The grooves were arranged at an interval of 2 mm in the form of a grid. The obtained molded ferrite sheet having grooves was cut into 100 mm squares and the PET film was peeled off. The cut ferrite sheets were calcined in the same manner as that in Example 1 to obtain sintered ferrite substrates each having a thickness of 150 μm and an outer dimension of 80 mm square. A conductive paint (Trade Name: DOTITE XE-9000, manufactured by Fujikura Kasei Co., Ltd.) containing silver and copper powder dispersed in a polyester-based resin was applied to the surface of the substrate which was not formed with the grooves. The applied coating was dried at 50° C. for 30 minutes to form a conductive layer having a thickness of 30 μm and a surface electric resistance of 0.2 Ω/square. To the surface of the conductive layer, a double coated adhesive tape (Product name: 467 MP, manufactured by Sumitomo 3M Limited) was adhered. To impart bendability to the resulting laminate, the sintered ferrite substrate layer was divided in the same manner as that in Example 6. The divided pieces were substantially uniform in shape and each in the form of a square of side 2 mm. The magnetic permeability of the laminate sheet was found to have μr' of 84 and μr" of 0.4.

Then, an antenna module was prepared by bonding the above-obtained conductive loop antenna and the above-obtained laminate sheet together using a double coated adhesive tape (Product name: 467 MP, manufactured by Sumitomo 3M Limited) such that the conductive loop of the antenna faces the opposite surface of the sintered ferrite substrate from the conductive layer. The bonding was carried out so that no gaps were formed in each of the bonding surfaces. Since obtained module had a resonant frequency of the antenna module to 10.8 MHz and Q of 68, a capacitor was connected in parallel to the loop antenna to adjust the resonant frequency to a range of 13.5 to 13.6 by changing the capacity. After the adjustment, the Q value was 64. When the resonant frequency was measured in a state where the conductive layer of the antenna module was in contact with an iron plate having a thickness of 1 mm, no change of the resonant frequency was observed before and after the attachment of the iron plate.

Example 8

An antenna module was prepared in the same manner as that in Example 7 except that the conductive layer was formed on the sintered ferrite substrate by applying thereon a nickel-acrylic-based conductive paint (Trade Name: DOTITE FN-101), followed by drying at 50° C. for 30 minutes and had a surface electric resistance of 2 Ω/square. The evaluation of the obtained antenna module revealed that the resonant frequency was 13.6 MHz and the Q value was 60. No change of the resonant frequency was observed before and after the attachment of the iron plate.

Example 9

An antenna module was prepared in the same manner as that in Example 7 except that the conductive layer was formed on the sintered ferrite substrate by printing a conductive silver paste on a green sheet of the substrate, followed by sintering the laminate at 900° C. and had a thickness of 10 μm. The evaluation of the obtained antenna module revealed that the surface electric resistance of the conductive layer was 0.1 Ω/square, the resonant frequency was 13.55 MHz and the Q value was 66. No change of the resonant frequency was observed before and after the attachment of the iron plate.

Comparative Example 6

An antenna module was prepared in the same manner as that in Example 7 except that a conductive layer was not formed on the sintered ferrite substrate. The obtained antenna module without an iron plate laminated thereon had a resonant frequency of 13.55 MHz and a Q value of 67. When the resonant frequency was measured with an iron plate of 1 mm thick laminated in the same manner as that in Example 7, the resonant frequency was 11.5 MHz and shifted to a low frequency side by 2 MHz, though the Q value was 67 and not changed. Because of the frequency shift, no resonance occurred at 13.56 MHz. The communication strength was considerably low.

Comparative Example 7

An antenna module having the same constitution as that of Comparative Example 6 except that the thickness of the sintered ferrite substrate was 300 μm was prepared and evaluated. The obtained antenna module had a resonant frequency of 14.1 MHz, when an iron plate was laminated thereon. Thus, the resonant frequency change was smaller as compared with the antenna module of Comparative Example 6. However, the communication strength was reduced.

Comparative Example 8

An antenna module having the same constitution as that of Example 7 except that the thickness of the conductive layer formed on the sintered ferrite substrate was 5 μm and that the surface electric resistance was 5 Ω/square was prepared in the same manner as that in Example 7. The obtained antenna was measured for its resonance characteristics. It was found that the resonant frequency was changed to 10.9 MHz and that the communication strength at 13.56 MHz was reduced.

Example 10

Using a pressure kneader, 1,000 parts by weight of a ferrite powder, obtained by surface-treating 1,000 parts by weight of Mg—Zn—Cu ferrite powder (composition: $Fe_2O_3$: 48.5 mol %, MgO: 27.0 mol %, ZnO: 14.5 mol %, CuO: 10.0 mol %; calcination conditions: 850° C., 180 minutes; cumulative 50% volume diameter: adjusted to 0.7 μm) with 10 parts by weight of a titanate-based coupling agent (KR-TTS manufactured by Ajinomoto Co., Inc.), 50 parts by weight of a thermoplastic elastomer (LUMITAC 22-1 manufactured by Tosoh Corporation), 100 parts by weight of polyethylene having a density of 0.9 g/cm³ and 20 parts by weight of stearic acid were kneaded at 130° C. for 40 minutes. The thus obtained kneaded mass of a ferrite resin composition was press molded at a temperature of 160° C. under a pressure of 100 kg/cm² for a pressurization time of 3 minutes using an iron plate, which had been sandblasted to have a center line average roughness (Ra) of 450 nm and a maximum height (Rmax) of 8 μm, to obtain a molded ferrite sheet having a thickness of 74 μm and a size of 100 mm square.

Ten such sheets were prepared and stacked one upon another. The stacked substrates were placed between top and bottom alumina setters (manufactured by Kikusui Chemical Industries Co., Ltd.) as support plate means and heated at 500° C. for 10 hours for removing the organic binder, followed by sintering at 940° C. for 2 hours to obtain sintered substrates. After cooling, the sintered substrates were peeled from each other. It was found that the sintered substrate was able to be easily peeled off without causing any damage.

The obtained sintered substrate had a thickness of 60 μm and an outer dimension of 80 mm square. A test piece having an outer diameter of 14 mm and an inner diameter of 8 mm was cut out from the substrate and measured for its magnetic permeability using Impedance Analyzer (E4991A manufactured by Agilent Technologies Co., Ltd.) and a jig (16454A) attached to its test station. It was found that μr' and μr" were 161 and 48, respectively, at 13.56 MHz. Thus, the obtained sintered ferrite substrates were not stuck to each other and had good magnetic characteristics.

The above-obtained molded ferrite sheet was found to have a surface roughness such that the center line average roughness (Ra) was 380 nm, the maximum height (Rmax) was 4.8 μm and an area occupancy rate of the cross-sectional area, taken along a horizontal plane at a depth of 50% of the maximum height in a square of side 100 μm, was 38%.

The obtained sintered ferrite substrate was found to have a surface roughness such that the center line average roughness (Ra) was 366 nm, the maximum height (Rmax) was 4.1 μm and an area occupancy rate of the cross-sectional area, taken along a horizontal plane at a depth of 50% of the maximum height in a square of side 100 μm, was 31%.

Example 11

Using a ball mill, 100 parts by weight of the same Mg—Zn—Cu ferrite as used in Example 10, 2 parts by weight of butyl phthalyl butyl glycolate, 12 parts of a polyvinylalcohol resin (ESLEK B BM-1 manufactured by Sekisui Chemical Co., Ltd.) and 60 parts by weight of a mixed solvent composed of 4 parts of n-butanol and 6 parts of toluene were mixed, dissolved or dispersed to obtain a ferrite-dispersed coating liquid. The ferrite-dispersed coating liquid was defoamed by an oil rotary vacuum pump and uniformly applied with a doctor blade to a PET film (LUMIMAT 50S200 TRES manufactured by Panak Co., Ltd.), one side of which had been sandblasted to have a center line average roughness (Ra) of 530 nm and a maximum height (Rmax) of 5.6 μm, to a given thickness. The coating was dried with hot wind at 100° C. for 30 minutes to obtain a molded ferrite sheet having a thickness of 210 μm.

The molded ferrite sheet was cut into squares of side 100 mm. Each of the cut sheets was peeled off from the PET film. The sheets were then sintered in the same conditions as those in Example 10 to obtain sintered ferrite substrates.

The obtained sintered ferrite substrate was evaluated for its physical properties and was found to have a thickness of 174 µm, an outer dimension of 80 mm square and magnetic permeability with µr' of 158 and µr" of 33. Further, the obtained sintered ferrite substrates did not stick to each other and were easily peeled off from each other.

The above-obtained molded ferrite sheet was found to have a surface roughness such that the center line average roughness (Ra) was 450 nm, the maximum height (Rmax) was 5.1 µm and an area occupancy rate of the cross-sectional area, taken along a horizontal plane at a depth of 50% of the maximum height in a square of side 100 µm, was 40%.

The surface of the above-obtained molded ferrite sheet which had not been brought into contact with the PET film was found to have a center line average roughness (Ra) of 131 nm, a maximum height (Rmax) of 1.8 µm and an area occupancy rate of the cross-sectional area, taken along a horizontal plane at a depth of 50% of the maximum height in a square of side 100 µm, of 97%. Thus, it was understood that the surface roughness was able to be controlled at will by the PET film used.

The above-obtained molded ferrite sheet was found to have a surface roughness such that the center line average roughness (Ra) was 338 nm, the maximum height (Rmax) was 3.6 µm and an area occupancy rate of the cross-sectional area, taken along a horizontal plane at a depth of 50% of the maximum height in a square of side 100 µm, was 21%.

Example 12

A kneaded mass of a ferrite resin composition was prepared in the same manner as that in Example 10 except that a mixture of 300 parts by weight of Mg—Zn—Cu ferrite powder (composition: $Fe_2O_3$: 48.5 mol %, MgO: 27.0 mol %, ZnO: 14.5 mol %, CuO: 10.0 mol %; calcination conditions: 1,000° C., 180 minutes; cumulative 50% volume diameter: 6 µm) and 700 parts by weight of the same Mg—Zn—Cu ferrite powder (cumulative 50% volume diameter: 0.7 µm) as used in Example 10 was used. The thus obtained kneaded mass was press molded at a temperature of 160° C. under a pressure of 100 kg/cm² for a pressurization time of 3 minutes using an iron plate, which had been processed to have a center line average roughness (Ra) of 120 nm and a maximum roughness of 2 µm, to obtain a molded ferrite sheet having a thickness of 188 µm and an outer size of 100 mm.

Using the thus obtained sheet, sintered ferrite substrates were prepared in the same manner as that in Example 10. The obtained sintered ferrite substrate was evaluated for its physical properties and was found to have a thickness of 157 µm and magnetic permeability with µr' of 144 and µr" of 21 at 13.56 MHz. Further, the substrates did not stick to each other and were easily peeled off from each other.

Because of the use of coarse particle ferrite, the above-obtained molded ferrite sheet had a center line average roughness (Ra) of 361 nm, a maximum height (Rmax) of 6.2 µm and an area occupancy rate of the cross-sectional area, taken along a horizontal plane at a depth of 50% of the maximum height in a square of side 100 µm, of 67%.

The sintered ferrite substrate had surface roughness such that the center line average roughness (Ra) was 305 nm, the maximum height (Rmax) was 4.0 µm and the area occupancy rate of the cross-sectional area, taken along a horizontal plane at a depth of 50% of the maximum height in a square of side 100 µm, was 49%.

Example 13

Sintered ferrite substrates were obtained in the same manner as that in Example 11 except that the application of the ferrite-dispersed coating liquid using the doctor blade was carried out under conditions so that a molded ferrite sheet obtained had a thickness of 43 µm.

The obtained sintered ferrite substrate was evaluated for its physical properties and was found to have a thickness of 37 µm and magnetic permeability with µr' of 156 and µr" of 31 at 13.56 MHz. Further, the substrates did not stick to each other and were easily peeled off from each other.

The obtained molded ferrite sheet had surface roughness such that the center line average roughness (Ra) of 345 nm, the maximum height (Rmax) of 4.0 µm and the area occupancy rate of the cross-sectional area, taken along a horizontal plane at a depth of 50% of the maximum height in a square of side 100 µm, was 23%.

The sintered ferrite substrate had surface roughness such that the center line average roughness (Ra) was 289 nm, the maximum height (Rmax) was 3.1 µm and the area occupancy rate of the cross-sectional area, taken along a horizontal plane at a depth of 50% of the maximum height in a square of side 100 µm, was 12%.

Example 14

Sintered ferrite substrates were obtained in the same manner as that in Example 11 except that the application of the ferrite-dispersed coating liquid using the doctor blade was carried out under conditions so that a molded ferrite sheet obtained had a thickness of 377 µm.

The obtained sintered ferrite substrate was evaluated for its physical properties and was found to have a thickness of 326 µm and magnetic permeability with µr' of 167 and µr" of 50 at 13.56 MHz. Further, the substrates did not stick to each other and was easily peeled off from each other.

The obtained molded ferrite sheet had surface roughness such that the center line average roughness (Ra) of 634 nm, the maximum height (Rmax) of 7.8 µm and the area occupancy rate of the cross-sectional area, taken along a horizontal plane at a depth of 50% of the maximum height in a square of side 100 µm, was 66%.

The sintered ferrite substrate had surface roughness such that the center line average roughness (Ra) was 593 nm, the maximum height (Rmax) was 7.8 µm and the area occupancy rate of the cross-sectional area, taken along a horizontal plane at a depth of 50% of the maximum height in a square of side 100 µm, was 39%.

Comparative Example 9

A kneaded mass of a ferrite resin composition was prepared in the same manner as that in Example 10. Using the kneaded mass, sintered ferrite substrates were prepared in the same manner as that in Example 10 except that an iron plate processed to have a center line average roughness (Ra) of 120 nm and a maximum roughness of 2 µm was used in the press molding. The substrates stuck so tightly to each other that it was difficult to peel off the substrates from each other. Although the substrate was partly unstuck from each other, breakage occurred when it was forcibly separated therefrom. Thus, no sintered ferrite substrates having a size of 80 mm square were obtained. The obtained sintered ferrite substrate had magnetic permeability with μr' of 160 and μr" of 48 at 13.56 MHz.

The obtained molded ferrite sheet had surface roughness such that the center line average roughness (Ra) of 98 nm, the maximum height (Rmax) of 0.9 μm and the area occupancy rate of the cross-sectional area, taken along a horizontal plane at a depth of 50% of the maximum height in a square of side 100 μm, was 5%.

The sintered ferrite substrate had surface roughness such that the center line average roughness (Ra) was 81 nm, the maximum height (Rmax) was 0.8 μm and the area occupancy rate of the cross-sectional area, taken along a horizontal plane at a depth of 50% of the maximum height in a square of side 100 μm, was 1%.

Comparative Example 10

A ferrite-dispersed coating liquid was prepared in the same manner as that in Example 11. The obtained coating liquid was uniformly applied with a doctor blade to a PET film (not sandblasted) having a center line average roughness (Ra) of 17 nm, a maximum height (Rmax) of 0.3 μm and a thickness of 50 μm. This was dried with hot wind at 100° C. for 30 minutes to obtain a molded ferrite sheet having a thickness of 217 μm.

The sheet was peeled off from the PET film. Ten such sheets were stacked one upon another and heated in the same manner as that in Example 10 to obtain sintered ferrite substrates. The obtained substrate was evaluated for its properties and was found to have a thickness of 177 μm. Since the substrates stuck so tightly to each other it was not possible to peel off the substrates from each other.

The obtained molded ferrite sheet had surface roughness such that the center line average roughness (Ra) of 78 nm, the maximum height (Rmax) of 1.8 μm and the area occupancy rate of the cross-sectional area, taken along a horizontal plane at a depth of 50% of the maximum height in a square of side 100 μm, was 87%.

The sintered ferrite substrate had surface roughness such that the center line average roughness (Ra) was 54 nm, the maximum height (Rmax) was 1.3 μm and the area occupancy rate of the cross-sectional area, taken along a horizontal plane at a depth of 50% of the maximum height in a square of side 100 μm, was 0.2%.

Comparative Example 11

A sheet was prepared in the same manner as that in Comparative Example 10 and was peeled off from the PET film. That surface of the molded ferrite sheet which had been in contact with the PET film was applied with 50 mg of zirconia powder having an average particle diameter of 5 μm by brushing. Thereafter, a calcination treatment was carried out in the same manner as that in Comparative Example 10 to obtain sintered ferrite substrates.

The evaluation of the sintered ferrite substrate revealed that the substrate had magnetic permeability with μr' of 157 and μr" of 31 at 13.56 MHz. The obtained sintered ferrite substrates had deposits of zirconia powder. During the removal of the zirconia powder deposits using a brush, four of the ten substrates were broken. The application of the powder and the removal of the powder were significantly troublesome. The powder deposits were not able to be completely removed.

Comparative Example 12

Sintered ferrite substrates were prepared in the same manner as that in Example 10 except that an iron plate processed to have a center line average roughness (Ra) of 1200 nm and a maximum height (Rmax) of 14 μm was used in the press molding. The substrates did not stuck to each other and were able to be peeled off from each other.

The obtained sintered ferrite substrate had magnetic permeability with μr' of 78 and μr" of 1 at 13.56 MHz and, thus, did not have satisfactory magnetic characteristics. Such deterioration of the magnetic permeability is considered to be attributed to the high surface roughness of the iron plate which resulted in an increase of void spaces in the cross-sections of the sintered ferrite substrate.

Comparative Example 13

A ferrite-dispersed coating liquid was prepared in the same manner as that in Example 11. The obtained coating liquid was uniformly applied with a doctor blade to a PET film (U4-50 manufactured by Teijin DuPont Co., Ltd) which had been processed to have a center line average roughness (Ra) of 252 nm and a maximum height (Rmax) of 3.3 μm. The coating was dried with hot wind at 100° C. for 30 minutes to obtain a molded ferrite sheet having a thickness of 198 μm. The sheet was peeled off from the PET film. Ten such sheets were stacked one upon another and heat-treated in the same manner as that in Example 10 to obtain sintered ferrite substrates.

The obtained substrate was evaluated for its properties and was found to have a thickness of 169 μm. Since the substrates stuck so tightly to each other it was not possible to peel off the substrates from each other.

The obtained molded ferrite sheet had surface roughness such that the center line average roughness (Ra) of 246 nm, the maximum height (Rmax) of 2.6 μm and the area occupancy rate of the cross-sectional area, taken along a horizontal plane at a depth of 50% of the maximum height in a square of side 100 μm, was 97%.

The sintered ferrite substrate had surface roughness such that the center line average roughness (Ra) was 201 nm, the maximum height (Rmax) was 2.1 μm and the area occupancy rate of the cross-sectional area, taken along a horizontal plane at a depth of 50% of the maximum height in a square of side 100 μm, was 96%.

It will be understood from above results that not only control of the surface roughness but also control of the area occupancy rate of the cross-sectional area is important in order to obtain the effects of the present invention.

TABLE 2

| | Molded Ferrite Sheet | | | |
| --- | --- | --- | --- | --- |
| | | Surface Roughness | | Bearing Analysis Data Area |
| | Thickness (μm) | Ra (nm) | Rmax (μm) | Rate* (%) |
| Example 10 | 74 | 380 | 4.8 | 38 |
| Example 11 | 210 | 450 | 5.1 | 40 |
| Example 12 | 188 | 361 | 6.2 | 67 |
| Example 13 | 43 | 345 | 4.0 | 23 |
| Example 14 | 377 | 634 | 7.8 | 66 |
| Comparative Example 9 | 82 | 98 | 0.9 | 5 |
| Comparative Example 10 | 217 | 78 | 1.8 | 87 |
| Comparative Example 11 | 180 | 60 | 1.2 | 5 |

TABLE 2-continued

| | Thickness (μm) | Sintered Density (g/cm³) | Surface Roughness Ra (nm) | Surface Roughness Rmax (μm) |
|---|---|---|---|---|
| Comparative Example 12 | 53 | 1005 | 14.2 | 65 |
| Comparative Example 13 | 198 | 246 | 2.6 | 97 |

Sintered Ferrite Substrate

| | Thickness (μm) | Sintered Density (g/cm³) | Surface Roughness Ra (nm) | Surface Roughness Rmax (μm) |
|---|---|---|---|---|
| Example 10 | 60 | 4.64 | 366 | 4.1 |
| Example 11 | 174 | 4.61 | 338 | 3.6 |
| Example 12 | 157 | 4.59 | 305 | 4.0 |
| Example 13 | 37 | 4.62 | 289 | 3.1 |
| Example 14 | 326 | 4.71 | 593 | 7.8 |
| Comparative Example 9 | 70 | 4.63 | 81 | 0.8 |
| Comparative Example 10 | 177 | 4.62 | 54 | 1.3 |
| Comparative Example 11 | 149 | 4.64 | 43 | 1.1 |
| Comparative Example 12 | 43 | 4.38 | 922 | 10.9 |
| Comparative Example 13 | 169 | 4.67 | 201 | 2.1 |

Sintered Ferrite Substrate

| | Bearing Analysis Data Area Rate* (%) | Sticking State | Magnetic Permeability μr' | Magnetic Permeability μr" |
|---|---|---|---|---|
| Example 10 | 31 | No sticking | 161 | 48 |
| Example 11 | 21 | No sticking | 158 | 33 |
| Example 12 | 49 | No sticking | 144 | 21 |
| Example 13 | 12 | No sticking | 156 | 31 |
| Example 14 | 39 | No sticking | 167 | 50 |
| Comparative Example 9 | 1 | Stuck | 160 | 48 |
| Comparative Example 10 | 0.2 | stuck | 159 | 44 |
| Comparative Example 11 | 2 | Partly stuck | 157 | 31 |
| Comparative Example 12 | 55 | No sticking | 78 | 1.1 |
| Comparative Example 13 | 96 | stuck | 165 | 50 |

*Area occupancy rate of the cross-sectional area, taken along a horizontal plane at a depth of 50% of the maximum height Example 15

A double coated adhesive tape (Product name: 467 MP, manufactured by Sumitomo 3M Limited) having a thickness of 50 μm was adhered onto the surface of the sintered ferrite substrate of Example 10 to which roughness had been imparted, thereby obtaining a laminate composed of a sintered ferrite substrate layer of 60 μm thick and a adhesive layer of 50 μm thick.

For the purpose of imparting the laminate with bendability, the laminate was placed on an urethane foam sheet having a thickness of 10 mm and an expansion ratio of about 10-fold and was then pressed with a rubber roller having an outer dimension of about 50 mm and a width of about 15 cm. The rubber roller was displaced in the X and Y directions of the laminate with a roll linear pressure of about 1 kg/cm so that cracks were formed throughout the sintered ferrite substrate.

A test piece having an outer diameter of 14 mm and an inner diameter of 8 mm was cut out and measured for its magnetic permeability. The magnetic permeability was found to have μr' of 121 and μr" of 10 at 13.56 MHz.

Also, the similar laminate was wound around an iron rod having an outer diameter of 30 mm. In the same manner as above, a test piece was cut out and measured for its magnetic permeability. The magnetic permeability was found to have μr' of 120 and μr" of 10 at 13.56 MHz and was similar to the above. Thus, the obtained laminates had good bendability and good magnetic permeability μr' of more than 80.

Example 16

A planar antenna composed of a PET film with a thickness of 25 μm and a 7-turn spiral conductive loop provided on the PET film was prepared. The loop had a rectangular shape with a length of 45 mm and a width of 75 mm.

A molded ferrite sheet having a thickness of 185 μm was prepared in the same manner as that in Example 11 using the same Mg—Zn—Cu ferrite as used in Example 10. Using a Thomson blade having V-shaped edges of each 30°, V-shaped grooves with a depth of about 90 μm are formed on one side of the molded sheet. The grooves were arranged at an interval of 2 mm in the form of a grid. The obtained molded ferrite sheet having grooves was cut into 100 mm squares and the PET film was peeled off. The cut ferrite sheets were calcined in the same manner as that in Example 10 to obtain sintered ferrite substrates.

The obtained sintered ferrite substrate had a thickness of 143 μm and an outer dimension of 80 mm square. A conductive paint (Trade Name: DOTITE XE-9000, manufactured by Fujikura Kasei Co., Ltd.) containing silver and copper powder dispersed in a polyester-based resin was applied to the surface of the substrate which was not formed with the grooves. The applied coating was dried at 50° C. for 30 minutes to form a conductive layer having a thickness of 30 μm and a surface electric resistance of 0.2 Ω/square.

To the surface of the conductive layer, a double coated adhesive tape (Product name: 467 MP, manufactured by Sumitomo 3M Limited) was adhered. To impart bendability to the resulting laminate, the sintered ferrite substrate layer was divided in the same manner as that in Example 15. The divided pieces were substantially uniform in shape and each in the form of a square of side 2 mm. The magnetic permeability of the laminate sheet was found to have μr' of 119 and μr" of 9.0.

Then, an antenna module was prepared by bonding the above-obtained conductive loop antenna and the above-obtained laminate sheet together using a double coated adhesive tape (Product name: 467 MP, manufactured by Sumitomo 3M Limited) such that the conductive loop of the antenna faces the opposite surface of the sintered ferrite substrate from the conductive layer. The bonding was carried out so that no gaps were formed in each of the bonding surfaces. Since obtained module had a resonant frequency of the antenna module to 15.5 MHz and Q of 67, a capacitor was connected in parallel to the loop antenna to adjust the resonant frequency to a range of 13.5 to 13.6 by changing the capacity. No change of Q was seen after the adjustment. When the resonant frequency was measured in a state where the conductive layer of the antenna module was in contact with an iron plate having a thickness of 1 mm, no change of the resonant frequency was observed before and after the attachment of the iron plate.

Example 17

An antenna module was prepared in the same manner as that in Example 16 except that the conductive layer was formed on the sintered ferrite substrate by applying thereon a nickel-acrylic-based conductive paint (Trade Name: DOTITE FN-101), followed by drying at 50° C. for 30 minutes and had a surface electric resistance of 2 Ω/square. The evaluation of the obtained antenna module revealed that the resonant frequency was 13.6 MHz and the Q value was 63. No change of the resonant frequency was observed before and after the attachment of the iron plate.

Example 18

An antenna module was prepared in the same manner as that in Example 16 except that the conductive layer was formed on the sintered ferrite substrate by printing a conductive silver paste on a green sheet of the substrate, followed by sintering the laminate at 900° C. and had a thickness of 10 μm. The evaluation of the obtained antenna module revealed that the surface electric resistance of the conductive layer was 0.1 Ω/square, the resonant frequency was 13.55 MHz and the Q value was 63. No change of the resonant frequency was observed before and after the attachment of the iron plate.

Comparative Example 14

An antenna module was prepared in the same manner as that in Example 16 except that a conductive layer was not formed on the sintered ferrite substrate. The obtained antenna module without an iron plate laminated thereon had a resonant frequency of 13.5 MHz and a Q value of 66. When the resonant frequency was measured with an iron plate of 1 mm thick laminated in the same manner as that in Example 13, the resonant frequency was 15.8 MHz and shifted to a high frequency side by 2.3 MHz, though the Q value was 66 and not changed. Because of the frequency shift, no resonance occurred at 13.56 MHZ. The communication strength was considerably low.

Comparative Example 15

An antenna module having the same constitution as that of Comparative Example 14 except that the thickness of the sintered ferrite substrate was 300 μm was prepared and evaluated. The obtained antenna module had a resonant frequency of 13.9 MHz, when an iron plate was laminated thereon. Thus, the resonant frequency change was smaller as compared with the antenna module of Comparative Example 14. However, the communication strength was reduced.

Comparative Example 16

An antenna module having the same constitution as that of Example 7 except that the thickness of the conductive layer formed on the sintered ferrite substrate was 5 μm and that the surface electric resistance was 5 Ω/square was prepared in the same manner as that in Example 16. The obtained antenna was measured for its resonance characteristics. It was found that the resonant frequency was changed to 15.0 MHz and that the communication strength at 13.56 MHz was reduced.

What is claimed is:

1. A sintered ferrite substrate having opposing surfaces and a thickness in a range of 25 μm to 360 μm, at least one surface of said opposing surfaces having the following surface roughness characteristics (a) to (c):
    (a) a center line average roughness is in a range of 150 nm to 700 nm,
    (b) a maximum height is in a range of 2 μm to 9 μm, and
    (c) an area occupancy rate of cross-sectional area taken along a horizontal plane at a depth of 50% of the maximum height in a square of side 100 μm is in a range of 10 to 80%.

2. A sintered ferrite substrate as recited in claim 1, wherein a conductive layer is provided on one of the opposing surfaces of the sintered ferrite substrate.

3. A sintered ferrite substrate as recited in claim 1, wherein grooves are formed on at least one of the opposing surfaces of the sintered ferrite substrate.

4. A sintered ferrite substrate as recited in claim 1, wherein an adhesive film is adhered to at least one of the opposing surfaces of the sintered ferrite substrate and wherein the sintered ferrite substrate is divided into a plurality of parts.

5. A sintered ferrite substrate having opposing surfaces and a thickness in a range of 25 μm to 360 μm, at least one surface of said opposing surfaces having the following surface roughness characteristics (a) to (c):
    (a) a center line average roughness is in a range of 150 nm to 700 nm,
    (b) a maximum height is in a range of 2 μm to 9 μm, and
    (c) an area occupancy rate of cross-sectional area taken along a horizontal plane at a depth of 50% of the maximum height in a square of side 100 μm is in a range of 10 to 80%,
    wherein the ferrite is Ni—Zn—Cu-based spinel ferrite and wherein said sintered ferrite substrate has a magnetic permeability with a real part μr' and an imaginary part μr" of not less than 80 and not greater than 20, respectively, at 13.56 MHz.

6. A sintered ferrite substrate having opposing surfaces and a thickness in a range of 25 μm to 360 μm, at least one surface of said opposing surfaces having the following surface roughness characteristics (a) to (c):
    (a) a center line average roughness is in a range of 150 nm to 700 nm,
    (b) a maximum height is in a range of 2 μm to 9 μm, and
    (c) an area occupancy rate of cross-sectional area taken along a horizontal plane at a depth of 50% of the maximum height in a square of side 100 μm is in a range of 10 to 80%,
    wherein the ferrite is Mg—Zn—Cu-based spinel ferrite and wherein said sintered ferrite substrate has a magnetic permeability with a real part μr' and an imaginary part μr" of not less than 80 and not greater than 100, respectively, at 13.56 MHz.

* * * * *